(12) United States Patent  
McNamer et al.

(10) Patent No.: US 8,508,580 B2  
(45) Date of Patent: Aug. 13, 2013

(54) METHODS, SYSTEMS, AND COMPUTER-READABLE STORAGE MEDIA FOR CREATING THREE-DIMENSIONAL (3D) IMAGES OF A SCENE

(75) Inventors: Michael McNamer, Apex, NC (US); Marshall Robers, Durham, NC (US); Tassos Markas, Chapel Hill, NC (US); Jason Paul Hurst, Cary, NC (US)

(73) Assignee: 3DMedia Corporation, Durham, NC (US)

( * ) Notice: Subject to any disclaimer, the term of this patent is extended or adjusted under 35 U.S.C. 154(b) by 308 days.

(21) Appl. No.: 12/842,084

(22) Filed: Jul. 23, 2010

(65) Prior Publication Data

US 2011/0025825 A1   Feb. 3, 2011

Related U.S. Application Data

(60) Provisional application No. 61/230,131, filed on Jul. 31, 2009.

(51) Int. Cl.  
*H04N 7/18* (2006.01)

(52) U.S. Cl.  
USPC ............................................. 348/43; 348/46

(58) Field of Classification Search  
USPC ...... 348/42–60, E13.009, E13.074; 382/154; 345/419  
See application file for complete search history.

(56) References Cited

U.S. PATENT DOCUMENTS

| 3,503,316 A | 3/1970 | Takano |
| 3,953,869 A | 4/1976 | Wah Lo |
| 4,661,986 A | 4/1987 | Adelson |
| 4,956,705 A | 9/1990 | Wright |
| 4,980,762 A | 12/1990 | Heeger |
| 5,043,806 A | 8/1991 | Choquet |

(Continued)

FOREIGN PATENT DOCUMENTS

| EP | 1056049 A2 | 11/2000 |
| EP | 1056049 A2 | 11/2000 |

(Continued)

OTHER PUBLICATIONS

Related application: Tassos Markas et al.; Methods, Systems, and Computer-Readable Storage Media for Identifying a Rough Depth Map in a Scene and for Determining a Stereo-Base Distance for Three-Dimensional (3D) Content Creation filed Dec. 27, 2011 as U.S. Appl. No. 13/337,676 (not yet published).

(Continued)

*Primary Examiner* — Andy Rao  
(74) *Attorney, Agent, or Firm* — Olive Law Group, PLLC

(57) ABSTRACT

Methods, systems, and computer program products for generating three-dimensional images of a scene are disclosed herein. According to one aspect, a method includes receiving a plurality of images of a scene. The method also includes determining attributes of the plurality of images. Further, the method includes determining, based on the attributes, a pair of images from among the plurality of images for use in creating a three-dimensional image. A user can, by use of the subject matter disclosed herein, use an image capture device for capturing a plurality of different images of the same scene and for converting the images into a three-dimensional, or stereoscopic, image of the scene. The subject matter disclosed herein includes a three-dimensional conversion process. The conversion process can include identification of suitable pairs of images, registration, rectification, color correction, transformation, depth adjustment, and motion detection and removal.

28 Claims, 25 Drawing Sheets

(56) References Cited

U.S. PATENT DOCUMENTS

| | | |
|---|---|---|
| 5,151,609 A | 9/1992 | Nakagawa |
| 5,305,092 A | 4/1994 | Mimura |
| 5,369,735 A | 11/1994 | Thier |
| 5,444,479 A | 8/1995 | Femekes |
| 5,511,153 A | 4/1996 | Azabayejani |
| 5,603,687 A | 2/1997 | Hori |
| 5,613,048 A | 3/1997 | Chen |
| 5,652,616 A | 7/1997 | Chen |
| 5,673,081 A | 9/1997 | Yamashita |
| 5,678,089 A | 10/1997 | Bacs, Jr. |
| 5,682,437 A | 10/1997 | Okino |
| 5,719,954 A | 2/1998 | Onda |
| 5,734,743 A * | 3/1998 | Matsugu et al. ............... 382/154 |
| 5,748,199 A | 5/1998 | Palm |
| 5,777,666 A | 7/1998 | Tanase |
| 5,808,664 A | 9/1998 | Yamashita |
| 5,874,988 A | 2/1999 | Gu |
| 5,883,695 A | 3/1999 | Paul |
| 5,953,054 A | 9/1999 | Mercier |
| 5,963,247 A | 10/1999 | Banitt |
| 5,991,551 A | 11/1999 | Bacs, Jr. |
| 6,018,349 A | 1/2000 | Szeliski |
| 6,023,588 A | 2/2000 | Ray |
| 6,031,538 A | 2/2000 | Chupeau |
| 6,047,078 A | 4/2000 | Kang |
| 6,064,759 A | 5/2000 | Buckley |
| 6,075,905 A | 6/2000 | Herman |
| 6,094,215 A | 7/2000 | Sundahl |
| 6,215,516 B1 | 4/2001 | Ma |
| 6,215,899 B1 * | 4/2001 | Morimura et al. ............ 382/154 |
| 6,240,198 B1 | 5/2001 | Rehg |
| 6,246,412 B1 | 6/2001 | Shum |
| 6,269,172 B1 | 7/2001 | Rehg |
| 6,269,175 B1 * | 7/2001 | Hanna et al. .................. 382/107 |
| 6,278,460 B1 | 8/2001 | Myers |
| 6,314,211 B1 | 11/2001 | Kim |
| 6,324,347 B1 | 11/2001 | Bacs, Jr. |
| 6,381,302 B1 | 4/2002 | Berestov |
| 6,384,859 B1 | 5/2002 | Matsumoto |
| 6,385,334 B1 | 5/2002 | Saneyoshi |
| 6,414,709 B1 | 7/2002 | Palm |
| 6,434,278 B1 | 8/2002 | Hashimoto |
| 6,445,833 B1 | 9/2002 | Murata |
| 6,496,598 B1 * | 12/2002 | Harman ....................... 382/154 |
| 6,512,892 B1 | 1/2003 | Montgomery |
| 6,556,704 B1 | 4/2003 | Chen |
| 6,559,846 B1 | 5/2003 | Uyttendaele |
| 6,611,268 B1 | 8/2003 | Szeliski |
| 6,661,913 B1 | 12/2003 | Zhang |
| 6,677,981 B1 | 1/2004 | Mancuso |
| 6,677,982 B1 | 1/2004 | Chen |
| 6,686,926 B1 | 2/2004 | Kaye |
| 6,747,610 B1 | 6/2004 | Taima |
| 6,750,904 B1 | 6/2004 | Lambert |
| 6,760,488 B1 | 7/2004 | Moura |
| 6,798,406 B1 | 9/2004 | Jones |
| 6,862,364 B1 | 3/2005 | Berestov |
| 6,927,769 B2 | 8/2005 | Roche, Jr. |
| 6,947,059 B2 | 9/2005 | Pierce |
| 6,967,659 B1 | 11/2005 | Jayavant |
| 6,970,591 B1 | 11/2005 | Lyons |
| 6,978,051 B2 | 12/2005 | Edwards |
| 7,027,642 B2 | 4/2006 | Rubbert |
| 7,046,840 B2 * | 5/2006 | Chang et al. .................. 382/154 |
| 7,054,478 B2 | 5/2006 | Harman |
| 7,068,275 B2 | 6/2006 | Nakamura |
| 7,081,892 B2 | 7/2006 | Alkouh |
| 7,103,213 B2 | 9/2006 | Hirvonen |
| 7,108,657 B2 | 9/2006 | Irion |
| 7,116,323 B2 | 10/2006 | Kaye |
| 7,116,324 B2 | 10/2006 | Kaye |
| 7,126,598 B2 | 10/2006 | Oh |
| 7,164,790 B2 | 1/2007 | Zhang |
| 7,180,536 B2 | 2/2007 | Wolowelsky |
| 7,181,061 B2 | 2/2007 | Kawano |
| 7,196,730 B2 | 3/2007 | Mihelcic |
| 7,197,192 B2 | 3/2007 | Edwards |
| 7,203,356 B2 | 4/2007 | Gokturk |
| 7,215,809 B2 | 5/2007 | Sato |
| 7,218,757 B2 | 5/2007 | Franz |
| 7,224,357 B2 | 5/2007 | Chen |
| 7,224,382 B2 | 5/2007 | Baker |
| 7,245,768 B1 | 7/2007 | Harman |
| 7,260,243 B2 | 8/2007 | Shibayama |
| 7,321,374 B2 | 1/2008 | Naske |
| 7,349,006 B2 | 3/2008 | Sato |
| 7,373,017 B2 | 5/2008 | Edwards |
| 7,397,481 B2 | 7/2008 | Endo |
| 7,400,782 B2 | 7/2008 | Zhou |
| 7,409,105 B2 | 8/2008 | Jiu |
| 7,466,336 B2 | 12/2008 | Regan |
| 7,483,590 B2 | 1/2009 | Nielsen |
| 7,489,812 B2 | 2/2009 | Fox |
| 7,508,977 B2 | 3/2009 | Lyons |
| 7,512,883 B2 | 3/2009 | Wallick |
| 7,515,759 B2 | 4/2009 | Sun |
| 7,538,876 B2 | 5/2009 | Hewitt |
| 7,551,770 B2 | 6/2009 | Harman |
| 7,557,824 B2 | 7/2009 | Holliman |
| 7,573,475 B2 | 8/2009 | Sullivan |
| 7,573,489 B2 | 8/2009 | Davidson |
| 7,580,463 B2 | 8/2009 | Routhier |
| 7,605,776 B2 | 10/2009 | Satoh |
| 7,616,886 B2 | 11/2009 | Matsumura |
| 7,619,656 B2 | 11/2009 | Ben-Ezra |
| 7,639,838 B2 | 12/2009 | Nims |
| 7,643,062 B2 | 1/2010 | Silverstein |
| 7,680,323 B1 | 3/2010 | Nichani |
| 7,693,221 B2 | 4/2010 | Routhier |
| 7,701,506 B2 | 4/2010 | Silverbrook |
| 7,705,970 B2 | 4/2010 | Piestun |
| 7,711,181 B2 | 5/2010 | Kee |
| 7,711,201 B2 | 5/2010 | Wong |
| 7,711,221 B2 | 5/2010 | Burgi |
| 7,768,702 B2 | 8/2010 | Hirose |
| 7,817,187 B2 | 10/2010 | Silsby |
| 7,844,001 B2 | 11/2010 | Routhier |
| 7,857,455 B2 | 12/2010 | Cowen |
| 7,873,207 B2 | 1/2011 | Tsubaki |
| 7,876,948 B2 | 1/2011 | Wetzel |
| 2002/0106120 A1 | 8/2002 | Brandenburg |
| 2002/0158873 A1 | 10/2002 | Wiliamson |
| 2002/0190991 A1 | 12/2002 | Efran |
| 2002/0191841 A1 | 12/2002 | Harman |
| 2003/0002870 A1 | 1/2003 | Baron |
| 2003/0030636 A1 | 2/2003 | Yamaoka |
| 2003/0151659 A1 | 8/2003 | Kawano |
| 2003/0152264 A1 | 8/2003 | Perkins |
| 2004/0100565 A1 | 5/2004 | Chen |
| 2004/0136571 A1 | 7/2004 | Hewitson |
| 2004/0218269 A1 * | 11/2004 | Divelbiss et al. ............. 359/464 |
| 2005/0041123 A1 | 2/2005 | Ansari |
| 2006/0008268 A1 | 1/2006 | Suwa |
| 2006/0203335 A1 | 9/2006 | Martin |
| 2006/0210111 A1 | 9/2006 | Cleveland |
| 2006/0221072 A1 | 10/2006 | Se et al. |
| 2006/0221179 A1 * | 10/2006 | Seo et al. ........................ 348/46 |
| 2006/0222260 A1 | 10/2006 | Sambongi |
| 2007/0024614 A1 | 2/2007 | Tam |
| 2007/0064098 A1 | 3/2007 | Tran |
| 2007/0146232 A1 | 6/2007 | Redert |
| 2007/0165129 A1 * | 7/2007 | Hill et al. ...................... 348/335 |
| 2007/0165942 A1 | 7/2007 | Jin |
| 2007/0168820 A1 | 7/2007 | Kutz |
| 2007/0189599 A1 * | 8/2007 | Ryu et al. ...................... 382/154 |
| 2007/0189747 A1 | 8/2007 | Ujisato |
| 2007/0291143 A1 | 12/2007 | Barbieri |
| 2008/0024614 A1 | 1/2008 | Li et al. |
| 2008/0031327 A1 | 2/2008 | Wang |
| 2008/0056609 A1 | 3/2008 | Rouge |
| 2008/0062254 A1 | 3/2008 | Edwards |
| 2008/0080852 A1 | 4/2008 | Chen |
| 2008/0117280 A1 | 5/2008 | Schowengerdt |
| 2008/0117289 A1 | 5/2008 | Schowegerdt |

| | | | |
|---|---|---|---|
| 2008/0150945 | A1 | 6/2008 | Wang |
| 2008/0158345 | A1 | 7/2008 | Schklair |
| 2008/0180550 | A1 | 7/2008 | Gulliksson |
| 2008/0240607 | A1 | 10/2008 | Sun |
| 2008/0252725 | A1 | 10/2008 | Lanfermann |
| 2008/0317379 | A1 | 12/2008 | Steinberg |
| 2009/0061381 | A1 | 3/2009 | Durbin |
| 2009/0080036 | A1 | 3/2009 | Paterson |
| 2009/0116732 | A1* | 5/2009 | Zhou et al. ............... 382/154 |
| 2009/0141967 | A1 | 6/2009 | Hiroshi |
| 2009/0154793 | A1 | 6/2009 | Shin |
| 2009/0154823 | A1 | 6/2009 | Ben-Ezra |
| 2009/0290013 | A1 | 11/2009 | Hayashi |
| 2009/0290037 | A1 | 11/2009 | Pore |
| 2009/0295907 | A1 | 12/2009 | Kim |
| 2010/0039502 | A1 | 2/2010 | Higgins |
| 2010/0097444 | A1 | 4/2010 | Lablans |
| 2010/0128109 | A1 | 5/2010 | Banks |
| 2010/0134598 | A1 | 6/2010 | St. Pierre |
| 2010/0142824 | A1 | 6/2010 | Lu |
| 2010/0165152 | A1 | 7/2010 | Lim |
| 2010/0182406 | A1* | 7/2010 | Benitez ..................... 348/46 |
| 2010/0201682 | A1* | 8/2010 | Quan et al. ............... 345/419 |
| 2010/0208942 | A1 | 8/2010 | Porter |
| 2010/0220932 | A1 | 9/2010 | Dong-Qing et al. |
| 2010/0238327 | A1 | 9/2010 | Griffith |
| 2010/0239158 | A1 | 9/2010 | Rouge |
| 2010/0309286 | A1 | 12/2010 | Chen |
| 2010/0309288 | A1 | 12/2010 | Stettner |
| 2011/0018975 | A1 | 1/2011 | Chen |
| 2011/0025825 | A1 | 2/2011 | McNamer et al. |
| 2011/0025829 | A1 | 2/2011 | McNamer |
| 2011/0025830 | A1 | 2/2011 | McNamer et al. |
| 2011/0050853 | A1 | 3/2011 | Zhang |
| 2011/0050859 | A1 | 3/2011 | Kimmel |
| 2011/0050864 | A1 | 3/2011 | Bond |
| 2011/0169921 | A1 | 7/2011 | Lee et al. |
| 2011/0255775 | A1 | 10/2011 | McNamer et al. |
| 2012/0105602 | A1 | 5/2012 | McNamer et al. |
| 2012/0314036 | A1 | 12/2012 | Dahi et al. |

FOREIGN PATENT DOCUMENTS

| | | | |
|---|---|---|---|
| EP | 1240540 | B1 | 2/2011 |
| EP | 1240540 | B1 | 2/2011 |
| GB | 2405764 | A | 9/2005 |
| GB | 2455316 | A | 6/2008 |
| GB | 2455316 | A | 6/2009 |
| KR | 10-0653965 | B1 | 12/2006 |
| WO | 2005025239 | A1 | 3/2005 |
| WO | WO2005/025239 | A1 | 3/2005 |
| WO | 2006/062325 | A1 | 6/2006 |
| WO | WO2006/062325 | A1 | 6/2006 |
| WO | 2008/016882 | A2 | 2/2008 |
| WO | 2008075276 | A1 | 6/2008 |
| WO | WO2008/075276 | A1 | 6/2008 |
| WO | 2009122200 | A1 | 10/2009 |
| WO | WO2009/122200 | A1 | 10/2009 |
| WO | 2010024479 | A1 | 3/2010 |
| WO | WO2010/024479 | A1 | 3/2010 |
| WO | 2010052741 | A1 | 5/2010 |
| WO | WO2010/052741 | A1 | 5/2010 |
| WO | 2010147609 | A1 | 12/2010 |
| WO | WO2010/147609 | A1 | 12/2010 |
| WO | 2011/014419 | A | 2/2011 |
| WO | 2011/014420 | A | 2/2011 |
| WO | 2011/014421 | A | 2/2011 |
| WO | 2011017308 | A1 | 2/2011 |
| WO | WO2011/014419 | A2 | 2/2011 |
| WO | WO2011/014420 | A2 | 2/2011 |
| WO | WO2011/014421 | A2 | 2/2011 |
| WO | WO2011/017308 | A1 | 2/2011 |
| WO | WO2012/016549 | A1 | 5/2012 |

OTHER PUBLICATIONS

Related application: Bahram Dahi et al.; Primary and Auxiliary Image Capture Devices for Image Processing and Related Methods filed May 25, 2011 as U.S. Appl. No. 13/115,589 and corresponding non-final Office Action mailed Oct. 11, 2011 and Examiner Interview dated Oct. 11, 2011 and Applicant's response filed Nov. 9, 2011; and corresponding final rejection mailed Dec. 2, 2011 and amendment after final mailed by Applicant on Jan. 2, 2012; corresponding Applicant Initiated Interview summary dated Jan. 10, 2012; corresponding Advisory Action mailed Jan. 12, 2012; and Applicant's Request for Continued Examination filed Jan. 20, 2012.

Related application: Search Report and Written Opinion for PCT International Patent Application No. PCT/US10/43022 filed Jul. 23, 2010.

Related application: Search Report and Written Opinion for PCT International Patent Application No. PCT/US10/43023 filed Jul. 23, 2010.

Related application: Search Report and Written Opinion for PCT International Patent Application No. PCT/US10/43025 filed Jul. 23, 2010.

Related application: Written Opinion/IPRP for PCT International Patent Application No. PCT/US11/59057 filed Nov. 3, 2011.

Related application: Tassos Markas et al.; Methods, Systems, and Computer-Readable Storage Media for Identifying a Rough Depth Map in a Scene and for Determining a Stereo-Base Distance for Three-Dimensional (3D) Content Creation filed Dec. 27, 2011 as PCT/US11/67349 (not yet published).

Related application: Bahram Dahi et al.; Primary and Auxiliary Image Capture Devices for Image Processing and Related Methods filed Dec. 9, 2011 as PCT/US11/64050 (not yet published).

Chen, Shu-Ching et al., Video Scene Change Detection Method Using Unsupervised Segmentation and Object Tracking, IEEE International Conference on Multimedia and Expo (CME), pp. 57-60, 2001.

Nöll, Tobias et al., Markerless Camera Pose Estimation—An Overview, Visualization of Large and Unstructured Data Sets—IRTG Workshop, pp. 45-54, 2010.

Chen, Shenchang Eric et al., View Interpolation for Image Synthesis, Proceedings of ACM SIGGRAPH, pp. 279-288, 1993.

McMillan, Jr., Leonard, An Image-Based Approach to Three-Dimensional Computer Graphics, PhD. Dissertation submitted to the University of North Carolina at Chapel Hill, Apr. 1997.

Related U.S. Appl. No. 12/842,171, filed Jul. 23, 2010, and titled Methods, Systems, and Computer-Readable Storage Media for Selecting Image Capture Positions to Generate Three-Dimensional Images.

Related U.S. Appl. No. 12/842,257, filed Jul. 23, 2010, and titled Methods, Systems, and Computer-Readable Storage Media for Generating Stereoscopic Content via Depth Map Creation.

Search Report and Written Opinion for PCT international application No. PCT/US2010/043022.

Search Results for PCT international application No. PCT/US2010/043023.

Search Results for PCT international application No. PCT/US2010/043025.

Michael McNamer et al; "Methods, Systems, and Computer-Readable Storage Media for Generating Three-Dimensional Images of a Scene," filed Jul. 31, 2009. U.S. Appl. No. 61/230,131.

Michael McNamer et al; "Methods, Systems, and Computer-Readable Storage Media for Generating Three-Dimensional Images of a Scene," filed Jul. 23, 2010. U.S. Appl. No. 12/842,084.

Michael McNamer et al; "Methods, Systems, and Computer-Readable Storage Media for Selecting Image Capture Positions to Generate Three-Dimensional Images," filed Jul. 31, 2009. U.S. Appl. No. 61/230,133.

Michael McNamer et al; "Methods, Systems, and Computer-Readable Storage Media for Selecting Image Capture Positions to Generate Three-Dimensional Images," filed Jul. 23, 2010. Utility U.S. Appl. No. 12/842,171.

Michael McNamer et al; "Methods, Systems, and Computer-Readable Storage Media for Generating Stereoscopic Content via a Depth Map Creation," filed Jul. 31, 2009. U.S. Appl. No. 61/230,138.

Michael McNamer et al; "Methods, Systems, and Computer-Readable Storage Media for Generating Stereoscopic Content via a Depth Map Creation," filed Jul. 23, 2010. Utility U.S. Appl. No. 12/842,257.

Michael McNamer et al, "Methods, Systems, and Computer-Readable Storage Media for Generating Three-Dimensional (3D) Images of a Scene," filed May 26, 2011, Utility U.S. Appl. No. 13/115,459.

Dahi et al, "Primary and Auxiliary Image Capture Devices for Image Processing and Related Methods," filed May 26, 2011, Utility U.S. Appl. No. 13/115,589.

ISR and Written Opinion mailed Jul. 18, 2012 for related application PCT/US11/64050 filed Dec. 9, 2011 and published as WO2012/091878 on Jul. 5, 2012.

Int'l. Preliminary Report on Patentability mailed May 16, 2013, for related application No. PCT/US2011/059057 filed Nov. 3, 2011.

Notice of Allowance mailed Mar. 26, 2013 for related U.S. Appl. No. 12/842,171.

Related U.S. Appl. No. 13/865,127, filed Apr. 17, 2013; not yet public.

Related PCT Patent Application Serial No. PCT/US13/37010 filed Apr. 17, 2013; not yet public.

Related U.S. Appl. No. 13/865,312, filed Apr. 18, 2013; not yet public.

Mahajan et al., "Moving Gradients: A Path-Based Method for Plausible Image Interpolation", Proceedings of ACM SIGGRAPH 2009, vol. 28, Issue 3 (Aug. 2009).

Notice of Allowance mailed Apr. 9, 2013 for related U.S. Appl. No. 13/584,744.

Issue Notification mailed Apr. 24, 2013 for related U.S. Appl. No. 13/584,744.

Related U.S. Appl. No. 13/888,737, filed May 7, 2013; not yet public.

Joly, Phillippe et al., Efficient automatic analysis of camera work and microsegmentation of video using spatiotemporal images, 1996, Signal Process Image Communication, pp. 295-307.

Krotkov, Eric et al., An Agile Stereo Camera System for Flexible Image Acquisition, 1988, IEEE, vol. 4, pp. 108-113.

U.S. Non-Final Office Action dated Nov. 26, 2012 for Related U.S. Appl. No. 12/842,171, filed Jul. 23, 2010.

Non-Final Office Action mailed Dec. 5, 2012 for related U.S. Appl. No. 12/842,257, filed Jul. 23, 2010.

Related U.S. Appl. No. 13/662,443, filed Oct. 27, 2012; not yet public.

Related U.S. Appl. No. 13/751,203, filed Jan. 28, 2013; not yet public.

Applicant-Initiated Interview Summary mailed Feb. 8, 2013 for related U.S. Appl. No. 12/842,171.

Related application: Bahram Dahi et al.; Primary and Auxiliary Image Capture Devices for Image Processing and Related Methods filed Aug. 13, 2012 as U.S. Appl. No. 13/584,744, not yet public.

Int'l. Search Report and Written Opinion mailed Sep. 7, 2012 for related application PCT/US2011/067349 filed Dec. 27, 2011 and published as WO2012/092246 on Jul. 5, 2012.

* cited by examiner

METHODS, SYSTEMS, AND COMPUTER-READABLE STORAGE MEDIA FOR CREATING THREE-DIMENSIONAL (3D) IMAGES OF A SCENE

CROSS REFERENCE TO RELATED APPLICATIONS

This application claims the benefit of U.S. provisional patent application No. 61/230,131, filed Jul. 31, 2009, the disclosure of which is incorporated herein by reference in its entirety. The disclosures of the following U.S. provisional patent applications, commonly owned and simultaneously filed Jul. 31, 2009, are all incorporated by reference in their entirety: U.S. provisional patent application No. 61/230,133; and U.S. provisional patent application No. 61/230,138.

TECHNICAL FIELD

The subject matter disclosed herein relates to generating an image of a scene. In particular, the subject matter disclosed herein relates to methods, systems, and computer-readable storage media for creating three-dimensional images of a scene.

BACKGROUND

Stereoscopic, or three-dimensional, imagery is based on the principle of human vision. Two separate detectors detect the same object or objects in a scene from slightly different positions and/or angles and project them onto two planes. The resulting images are transferred to a processor which combines them and gives the perception of the third dimension, i.e. depth, to a scene.

Many techniques of viewing stereoscopic images have been developed and include the use of colored or polarizing filters to separate the two images, temporal selection by successive transmission of images using a shutter arrangement, or physical separation of the images in the viewer and projecting them separately to each eye. In addition, display devices have been developed recently that are well-suited for displaying stereoscopic images. For example, such display devices include digital still cameras, personal computers, digital picture frames, set-top boxes, high-definition televisions (HDTVs), and the like.

The use of digital image capture devices, such as digital still cameras, digital camcorders (or video cameras), and phones with built-in cameras, for use in capturing digital images has become widespread and popular. Because images captured using these devices are in a digital format, the images can be easily distributed and edited. For example, the digital images can be easily distributed over networks, such as the Internet. In addition, the digital images can be edited by use of suitable software on the image capture device or a personal computer.

Digital images captured using conventional image capture devices are two-dimensional. It is desirable to provide methods and systems for using conventional devices for creating three-dimensional images.

SUMMARY

Methods, systems, and computer program products for creating three-dimensional images of a scene are disclosed herein. According to one aspect, a method includes receiving a plurality of images of a scene. The method also includes determining attributes of the plurality of images. Further, the method includes determining, based on the attributes of all captured images, a pair of images from among the plurality of images for use in creating a three-dimensional image.

According to another aspect, a user can, by use of the subject matter disclosed herein, use an image capture device for capturing a plurality of different images of the same scene and for creating a three-dimensional, or stereoscopic, image of the scene. The subject matter disclosed herein includes a process for creating three-dimensional images. The generation process can include identification of suitable pairs of images, registration, rectification, color correction, transformation, depth adjustment, and motion detection and removal. The functions of the subject matter disclosed herein can be implemented in hardware and/or software that can be executed on an image capture device or a suitable display device. For example, the functions can be implemented using a digital still camera, a personal computer, a digital picture frame, a set-top box, an HDTV, and the like.

According to another aspect, a system for creating a three-dimensional image of a scene is disclosed. The system may include a memory having stored therein computer-executable instructions. The system may also include a computer processor that executes the computer-executable instructions. Further, the system may include an image generator configured to receive a plurality of images of a scene. The image generator may also be configured to determine attributes of the plurality of images. The image generator may also be configured to determine, based on the attributes, a pair of images from among the plurality of images for use in generating a three-dimensional image.

According to another aspect, the pair of images comprises different perspective views of the scene.

According to another aspect, the image generator may be configured to compare color attributes of the images; determine images in which the color attributes are within a predetermined color threshold; and modify the images within the predetermined color threshold for creating the three-dimensional image.

According to another aspect, the image generator is configured to: identify similar objects in the plurality of images; and compare images including the similar objects for occlusion.

According to another aspect, the image generator is configured to: identify similar objects in the plurality of images; and compare vertical displacement of the similar objects with respect to a predetermined threshold level.

According to another aspect, the image generator is configured to compare color differences between images.

According to another aspect, the image generator is configured to apply horizontal and vertical edge line analysis to images.

According to another aspect, the image generator is configured to: apply a Hough transform to identify lines within the images; and determine perspective view changes between the images based on the identified lines.

According to another aspect, the three-dimensional image includes a stereoscopic pair representing a left view image and a right view image.

According to another aspect, the image generator is configured to automatically determine the left view image and the right view image for creating the stereoscopic pair.

According to another aspect, the image generator is configured to: receive the left view image and the right view image from different sources; and automatically create the three-dimensional image using the left view image and the right view image.

According to another aspect, the image generator is configured to determine interest points within the left view image and the right view image for one or more of rectification and registration.

According to another aspect, the image generator is configured to: perform horizontal and vertical edge detection; filter for strong edges of a minimum length; and identify crossing points of the strong edges.

According to another aspect, the image generator is configured to: determine a parallax disparity between the left view image and the right view image; determine whether the parallax disparity meets a predetermined criteria; and, if the parallax disparity does not meet the predetermined criteria, adjust an attribute of at least one pixel in one of the left view image and the right view image such that the parallax disparity meets the predetermined criteria.

According to another aspect, the image generator is configured to crop one of the left view image and the right view image.

According to another aspect, the image generator is configured to: determine a parallax disparity between at least a portion of an object in the left view image and the right view image; determine whether the parallax disparity is greater than a predetermined threshold level; and, if the parallax disparity is greater than the predetermined threshold level, remove the object from the left view image and the right view image.

According to another aspect, the system further includes an image capture device for capturing the plurality of images of the scene.

According to another aspect, the image capture device is one of a digital still camera, a video camera, a mobile phone, and a smart phone for capturing the plurality of images of the scene.

According to another aspect, the image generator is configured to generate a three-dimensional image of the scene using the pair of images.

According to another aspect, the image generator is configured to implement: one or more of registration, rectification, color correction, matching edges of the pair of images, transformation, depth adjustment, motion detection, and removal of moving objects.

According to another aspect, the image generator is configured to display the three-dimensional image on a suitable three-dimensional image display.

According to another aspect, the image generator is configured to display the three-dimensional image on a device such as a digital still camera, a computer, a video camera, a digital picture frame, a set-top box, phone, or a high-definition television.

According to an aspect, a system for generating a three-dimensional video of a scene is disclosed. The system may include a memory having stored therein computer-executable instructions. The system may also include a computer processor that executes the computer-executable instructions. Further, the system may include an image generator configured to: receive a video sequence comprising a plurality of still images of a scene; determine attributes of the plurality of still images; and determine, based on the attributes, a plurality of stereoscopic image pairs from among the plurality of still images for use in generating a three-dimensional video.

According to another aspect, the computer processor and memory are configured to adjust at least one of a parallax and perspective of each image pair such that at least one of a predetermined orientation and depth results.

According to another aspect, the computer processor and memory are configured to sequence stereoscopic image pairs in the three-dimensional video according to an order of the video sequence of the still images.

According to another aspect, the computer processor and memory are configured to compress the image pairs of the three-dimensional video.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the invention is not limited to the specific methods and instrumentalities disclosed. In the drawings.

DETAILED DESCRIPTION

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Methods, systems, and computer program products for creating one or more three-dimensional images of a scene are disclosed herein. The three-dimensional images can be viewed or displayed on a stereoscopic display. The three-dimensional images may also be viewed or displayed on any other display capable of presenting three-dimensional images to a person using other suitable equipment, such as, but not limited to, three-dimensional glasses. In addition, the functions and methods described herein may be implemented on a device capable of capturing still images, displaying three-dimensional images, and executing computer executable instructions on a processor. The device may be, for example, a digital still camera, a video camera (or camcorder), a personal computer, a digital picture frame, a set-top box, an HDTV, a phone, or the like. Such devices may be capable of presenting three-dimensional images to a person without additional equipment, or if used in combination with other suitable equipment such as three-dimensional glasses. The functions of the device may include methods for rectifying and registering at least two images, matching the color and edges of the images, identifying moving objects, removing or adding moving objects from or to the images to equalize them, altering a perceived depth of objects, and any final display-specific transformation to create a single, high-quality three-dimensional image. The techniques described herein may be applied to still-captured images and video images, which can be thought of as a series of images; hence for the purpose of generalization the majority of the description herein is limited to still-captured image processing.

It should be noted that any of the processes and steps described herein may be implemented in an automated fashion. For example, any of the methods and techniques described herein may be automatically implemented without user input after the capture of a plurality of images.

Figure 1:
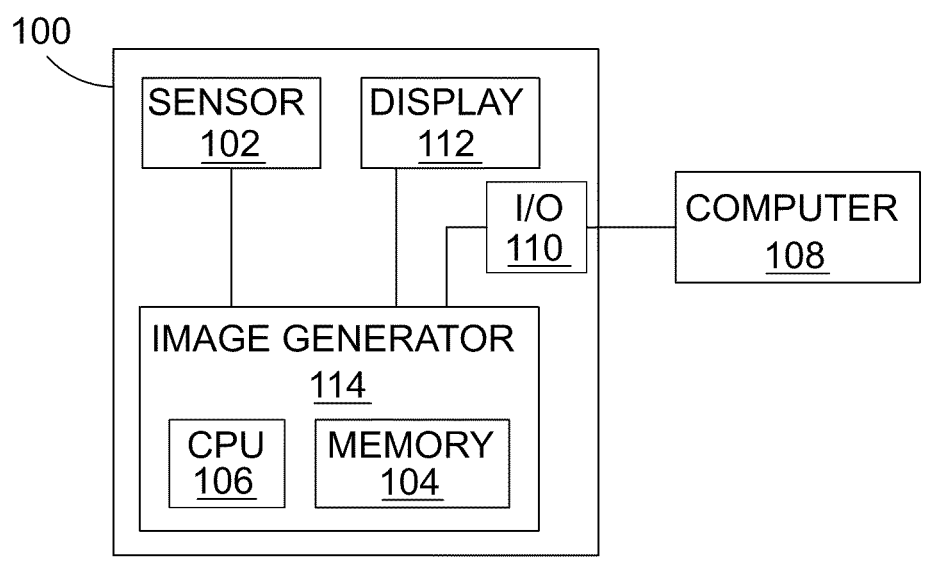
FIG. 1 is a block diagram of an exemplary device for creating three-dimensional images of a scene according to embodiments of the present invention.

FIG. 1 illustrates a block diagram of an exemplary device 100 for creating three-dimensional images of a scene according to embodiments of the present invention. In this example, device 100 is a digital camera capable of capturing several consecutive, still digital images of a scene. In another example, the device 100 may be a video camera capable of capturing a video sequence including multiple still images of a scene. A user of the device 100 may position the camera in different positions for capturing images of different perspective views of a scene. The captured images may be suitably stored, analyzed and processed for creating three-dimensional images as described herein. For example, subsequent to capturing the images of the different perspective views of the scene, the device 100, alone or in combination with a computer, may use the images for creating a three-dimensional image of the scene and for displaying the three-dimensional image to the user.

Referring to FIG. 1, the device 100 may include a sensor array 102 of charge coupled device (CCD) or CMOS sensors which may be exposed to a scene through a lens and exposure control mechanism as understood by those of skill in the art. The device 100 may also include analog and digital circuitry such as, but not limited to, a memory 104 for storing program instruction sequences that control the device 100, together with a CPU 106, in accordance with embodiments of the present invention. The CPU 106 executes the program instruction sequences so as to cause the device 100 to expose the sensor array 102 to a scene and derive a digital image corresponding to the scene. The digital image may be stored in the memory 104. All or a portion of the memory 104 may be removable, so as to facilitate transfer of the digital image to other devices such as a computer 108. Further, the device 100 may be provided with an input/output (I/O) interface 110 so as to facilitate transfer of digital image even if the memory 104 is not removable. The device 100 may also include a display 112 controllable by the CPU 106 and operable to display the images for viewing by a user.

Figure 2:
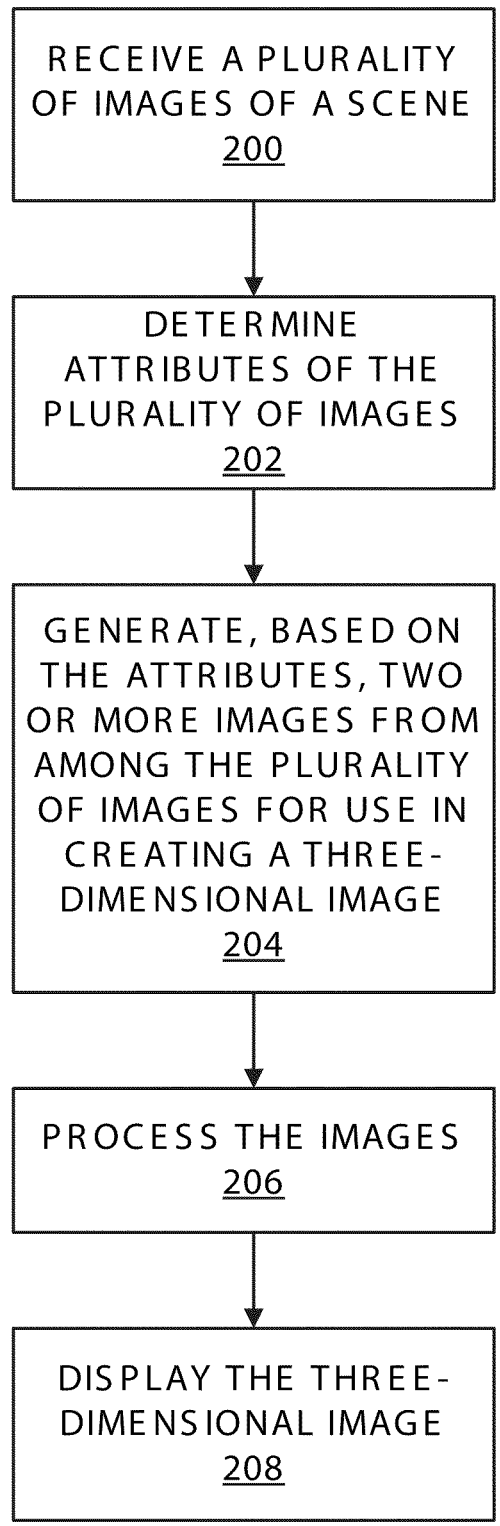
FIG. 2 is a flow chart of an exemplary method for creating a three-dimensional image of a scene using the device shown in FIG. 1 or any other suitable device described herein in accordance with embodiments of the present invention.
Figure 3A:
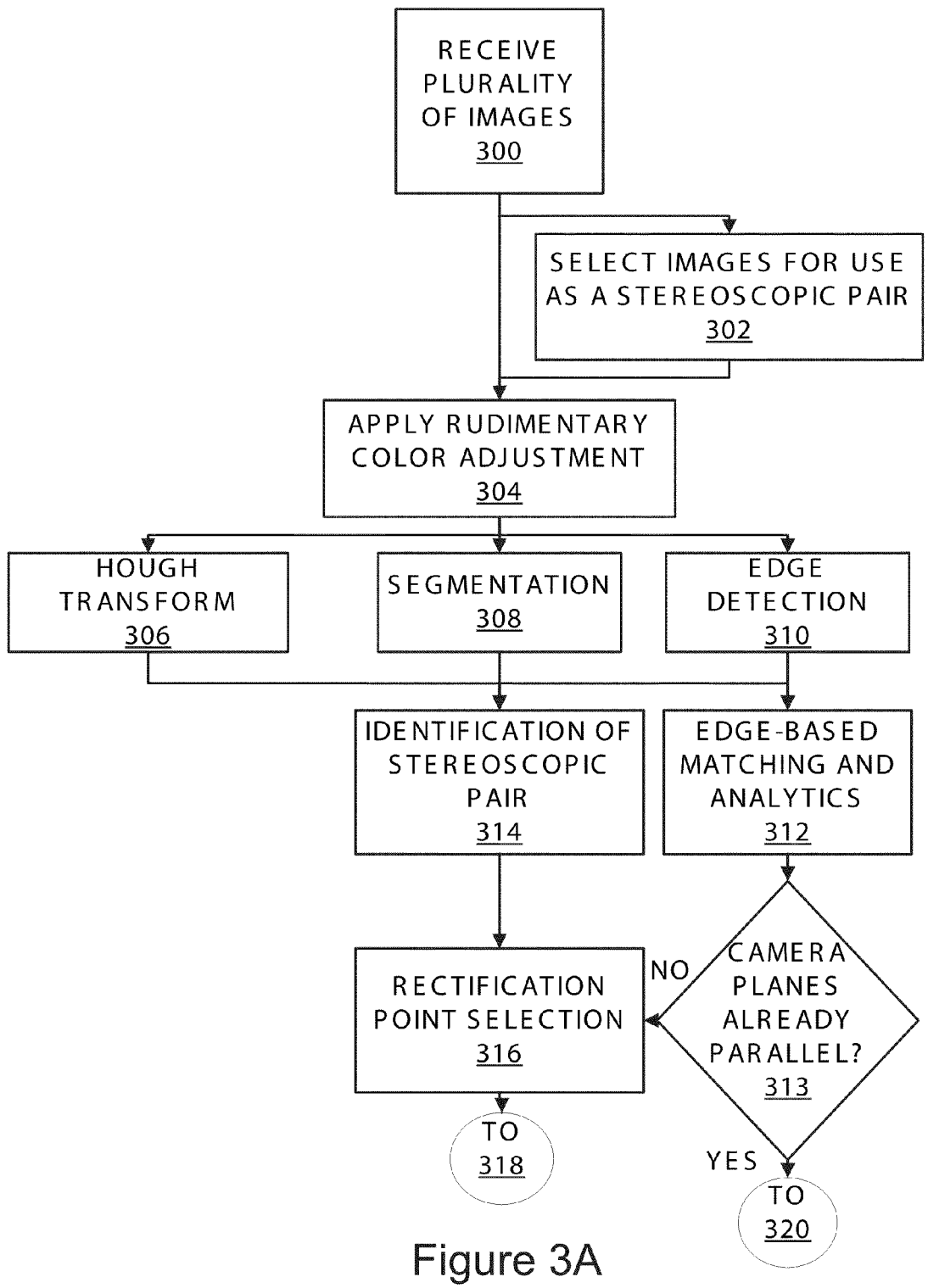
FIGS. 3A-3D are a flow chart of an exemplary method for creating a three-dimensional image of a scene in accordance with embodiments of the present invention.
Figure 3B:
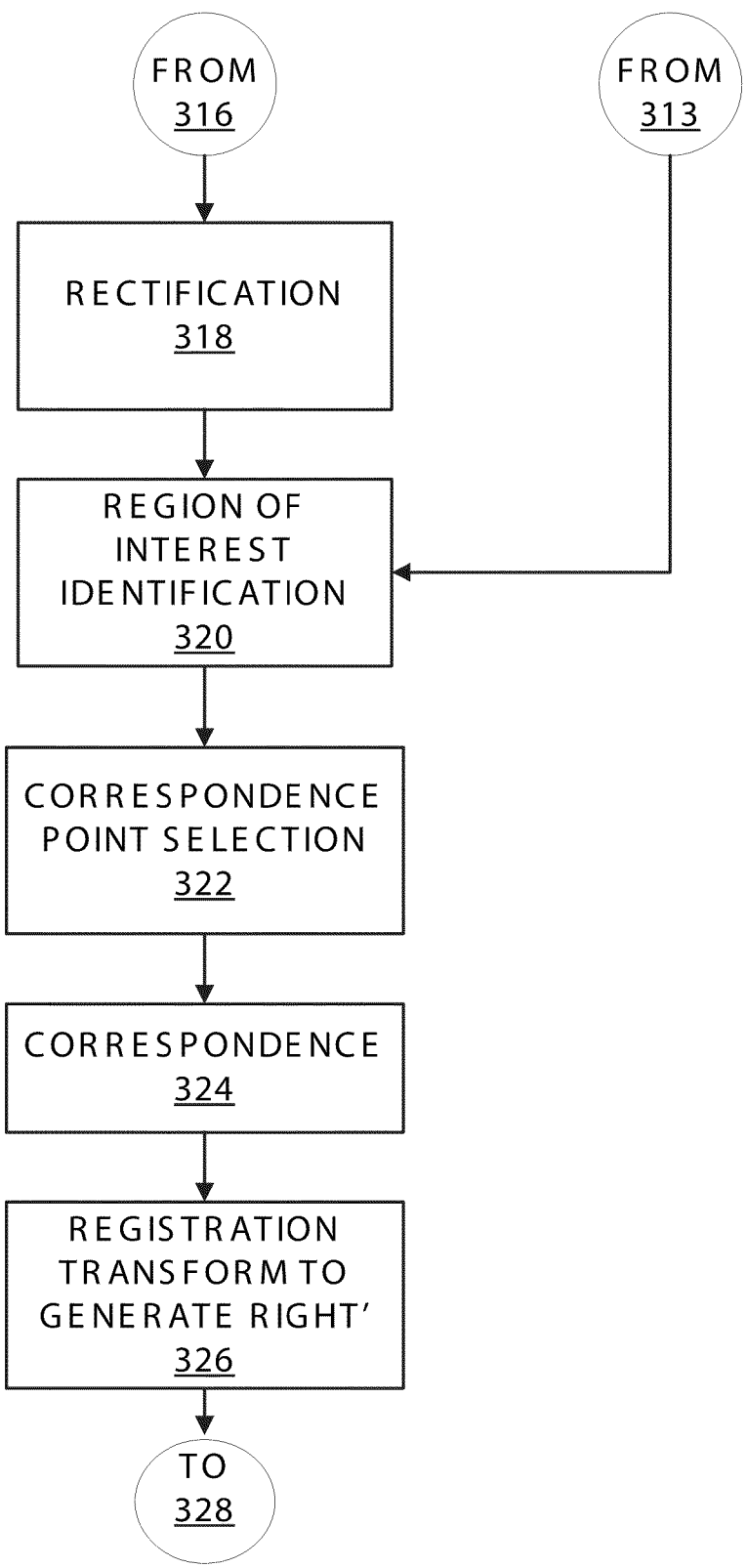
Figure 3C:
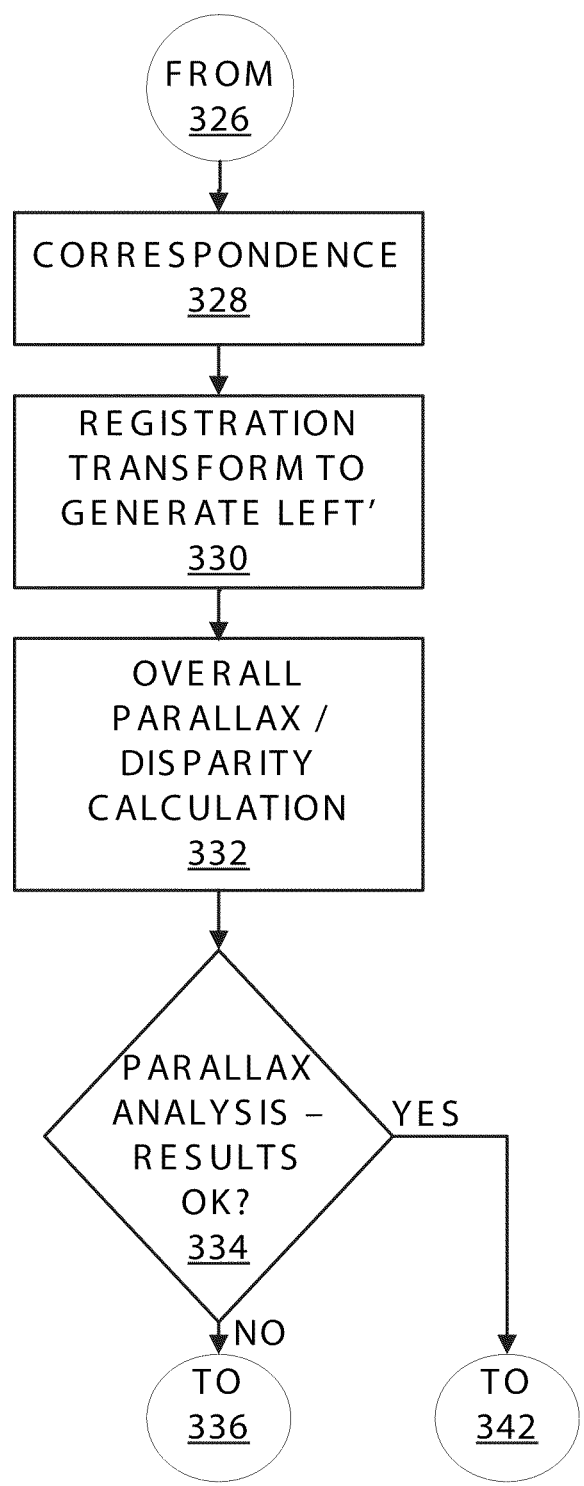
Figure 3D:
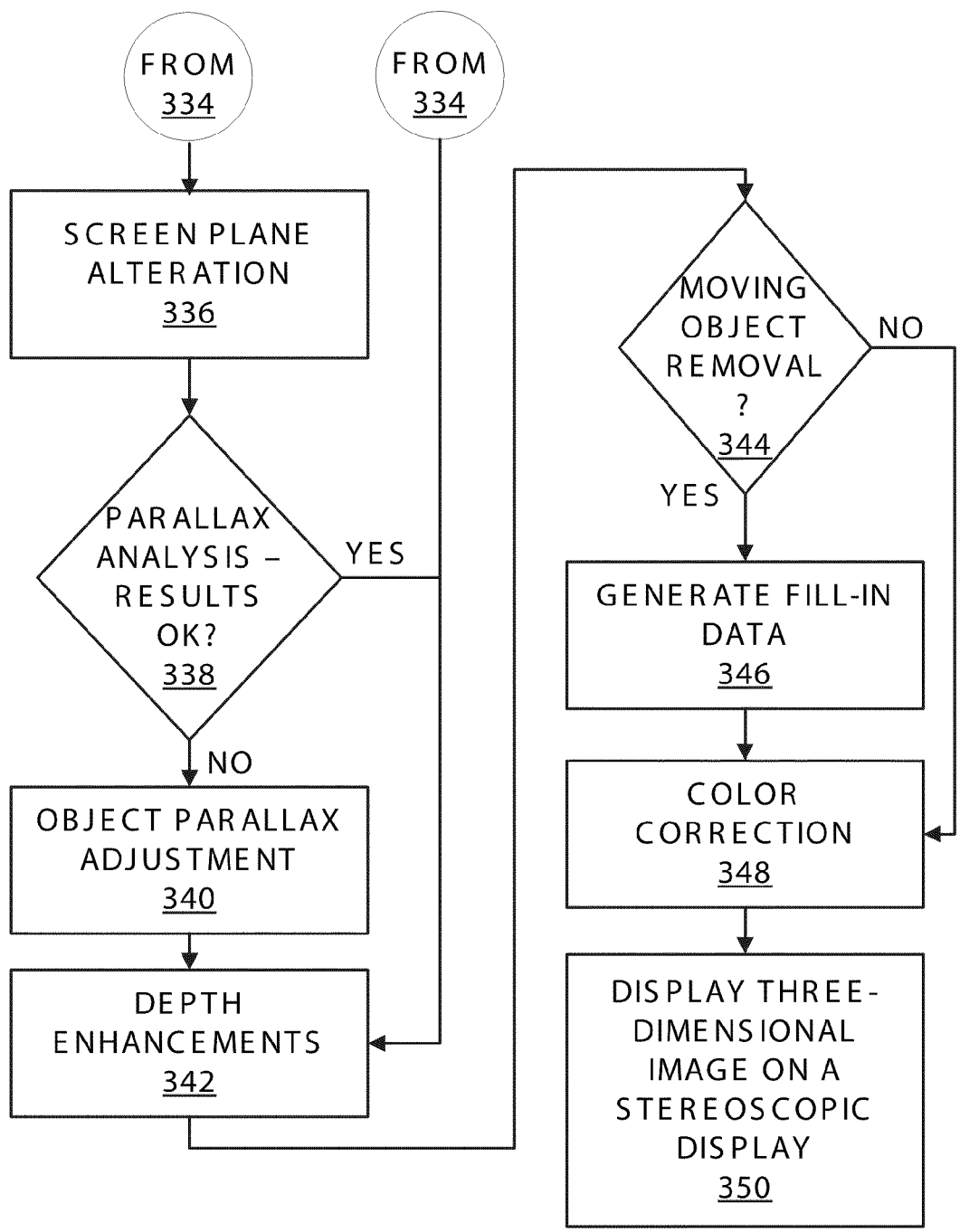

The memory 104 and the CPU 106 may be operable together to implement an image generator function 114 for creating three-dimensional images in accordance with embodiments of the present invention. The image generator function 114 may generate a three-dimensional image of a scene using two or more images of the scene captured by the device 100. FIG. 2 illustrates a flow chart of an exemplary method for creating a three-dimensional image of a scene using the device 100, alone or together with any other suitable device, in accordance with embodiments of the present invention. Referring to FIG. 2, the method includes receiving 200 a plurality of images of a scene. For example, a user of the device 100 may use the input features of the device and move the device to different positions for capturing a plurality of images of a scene to which the sensor array 102 is exposed. The different images can include images of different perspective views of the scene. The CPU 106 may then implement instructions stored in the memory 104 for storing the captured images in the memory 104.

The method of FIG. 2 includes determining 202 attributes of the plurality of images. For example, attributes of an image captured by an image capture device may include, but are not limited to, analysis of color(s), including mean, standard deviation, histogram correlation, cross correlation, edges, junctions, identified objects, size, orientation, and timestamps of images. For each captured image, the image generator function 114 can determine one or more attributes. Additional exemplary details of determining attributes of images are provided herein.

The method of FIG. 2 also includes generating 204, based on the attributes, two or more images from among the plurality of images for use in creating a three-dimensional image. For example, the image generator function 114 may compare the measured value of an attribute of one image to the measured value of an attribute of another image for determining a difference of the measured values. The image generator function 114 may then determine whether the difference meets a threshold value level. If the threshold criterion is met, the image generator function 114 determines that the images may be selected for use in creating a three-dimensional image. This process may be used for preliminarily and efficiently determining whether images are candidates for pairing as a three-dimensional image as described in further detail herein.

The generated two or more images may also be suitably processed 206. For example, the images may be corrected and adjusted for display as described herein.

The method of FIG. 2 includes displaying 206 the three-dimensional image. For example, the three-dimensional image may be displayed on the display 112. In another example, the three-dimensional image may be communicated to and displayed on another device such as, but not limited to, a computer, video camera, digital picture frame, a set-top box, and a high-definition television.

Although the above examples are described for use with a device capable of capturing images, embodiments of the present invention described herein are not so limited. Particularly, the methods described herein for creating a three-dimensional image of a scene may for example be implemented in any suitable system including a memory and computer processor. The memory may have stored therein computer-executable instructions. The computer processor may execute the computer-executable instructions. The memory and computer processor may be configured for implementing methods in accordance with embodiments of the present invention described herein.

FIGS. 3A-3D illustrate a flow chart of an exemplary method for creating a three-dimensional image of a scene in accordance with embodiments of the present invention. The method can convert a plurality of images to a three-dimensional image that can be viewed on a stereoscopic display. Referring to FIGS. 3A-3D, the method can begin with receiving 300 a plurality of images of a scene. For example, the images can be captured by a standard digital video or still camera, or a plurality of different cameras of the same type or different type. A camera user may capture an initial image. Next, the camera user may capture subsequent image(s) at positions to the left or right of the position at which the initial image was captured. These images may be captured as still images or as a video sequence of images. The images may be captured using a device such as the device 100 shown in FIG. 1. The images may be stored in a memory such as the memory 104 shown in FIG. 1. In another example, the images may be received at a device after they have been captured by a different device.

Figure 4A:
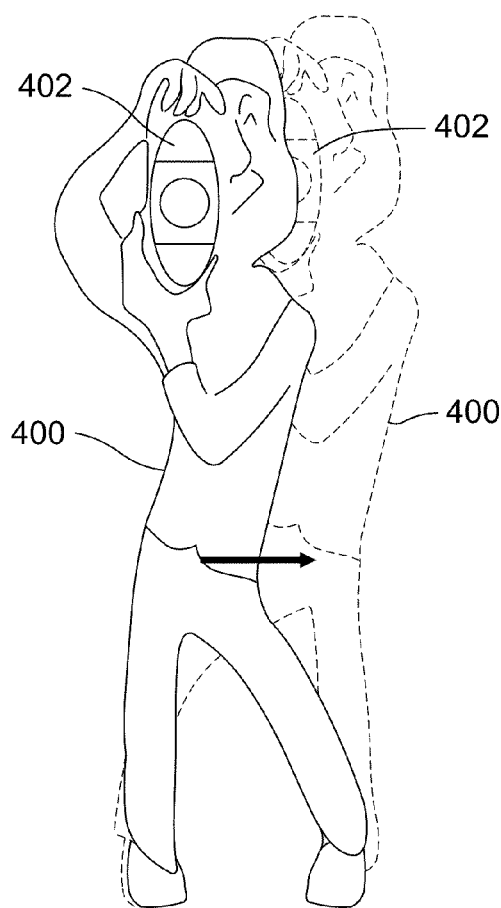
FIG. 4A is a front view of a user moving between positions for capturing different images using a camera in accordance with embodiments of the present invention.

Images suitable for use as a three-dimensional image may be captured by a user using any suitable technique. For example, FIG. 4A illustrates a front view of a user 400 moving between positions for capturing different images using a camera 402 in accordance with embodiments of the present invention. Referring to FIG. 4A, the user 400 is shown in solid lines in one position for capturing an image using the camera 402. The user 400 is shown in broken lines in another position for capturing another image using the camera 402. The camera 402 is also at different positions for capturing images offering different perspective views of a scene. In this example, the user 400 stands with his or her feet separated by a desired binocular distance, then captures the first image while aligning the camera over his or her right foot (the position of the user 400 shown in solid lines). Then the user captures the second image, and possibly other images in between, while aligning the camera 402 over his or her left foot (the position of the user 400 shown in broken lines). The captured images may be used for creating a three-dimensional image in accordance with embodiments of the present invention.

Figure 4B:
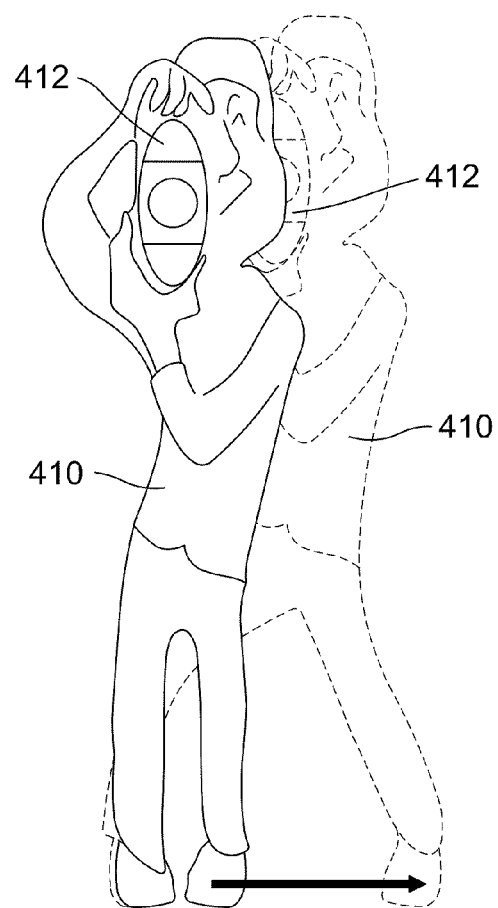
FIG. 4B is a front view of a user moving between positions for capturing images using a camera in accordance with embodiments of the present invention.

In another example, FIG. 4B illustrates a front view of a user 410 moving between positions for capturing different images of a scene using a camera 412 in accordance with embodiments of the present invention. Referring to FIG. 4B, the user 410 stands with his or her feet together and uses the camera 412 to capture the first image while maintaining a centered pose (the position of the user 410 shown in solid lines). Then the user moves one of his or her feet away from the other by twice the desired binocular distance while maintaining a centered pose and uses the camera 412 to capture the second image, and possibly other images in between (the position of the user 410 shown in broken lines). The captured images may be used for creating a three-dimensional image in accordance with embodiments of the present invention.

The distance between positions at which images are captured (the stereo baseline) for creating a three-dimensional image can affect the quality of the three-dimensional image. The optimal stereo baseline between the camera positions can vary anywhere between 3 centimeters (cm) and several feet, dependent upon a variety of factors, including the distance of the closest objects in frame, the lens focal length or other optics properties of the camera, the camera crop factor (dependent on sensor size), the size and resolution of the display on which the images will be viewed, and the distance from the display at which viewers will view the images. A general recommendation is that the stereo baseline should not exceed the distance defined by the following equation:

$$B = \frac{12D}{30FC/50},$$

where B is the stereo baseline separation in inches, D is the distance in feet to the nearest object in frame, F is the focal length of the lens in millimeters (mm), and C is the camera crop factor relative to a full frame (36×24 square mm.) digital sensor (which approximates the capture of a 35 mm analog camera). In the examples provided herein, it is assumed that at least two images have been captured, at least two of which can be interpreted as a stereoscopic pair.

The identification of stereo pairs in 302 is bypassed in the cases where the user has manually selected the image pair for 3D image registration. This bypass can also be triggered if a 3D-enabled capture device is used that identifies the paired images prior to the registration process. Returning to FIGS. 3A-3D, the method includes selecting 302 two images among the plurality of captured images for use as a stereoscopic pair. For example, the image generator function 114 shown in FIG. 1 may be used for selecting captured images for use as a stereoscopic pair. One or more metrics can be defined for measuring one or more attributes of the plurality of images for selecting a stereoscopic pair. For example, a buffer of M consecutive images may be maintained, or stored in the memory 104. The attributes of image with index m are compared with the corresponding attributes of image m+1. If there is no match between those two images, image m+1 is compared with image m+2. If images are determined to be sufficiently matched so as to be stereoscopic, and after those images have been processed as described below to generate a three-dimensional image, the m and m+2 images are compared to also identify a possible stereoscopic pair. The process may continue for all or a portion of the images in the buffer.

Figure 5:
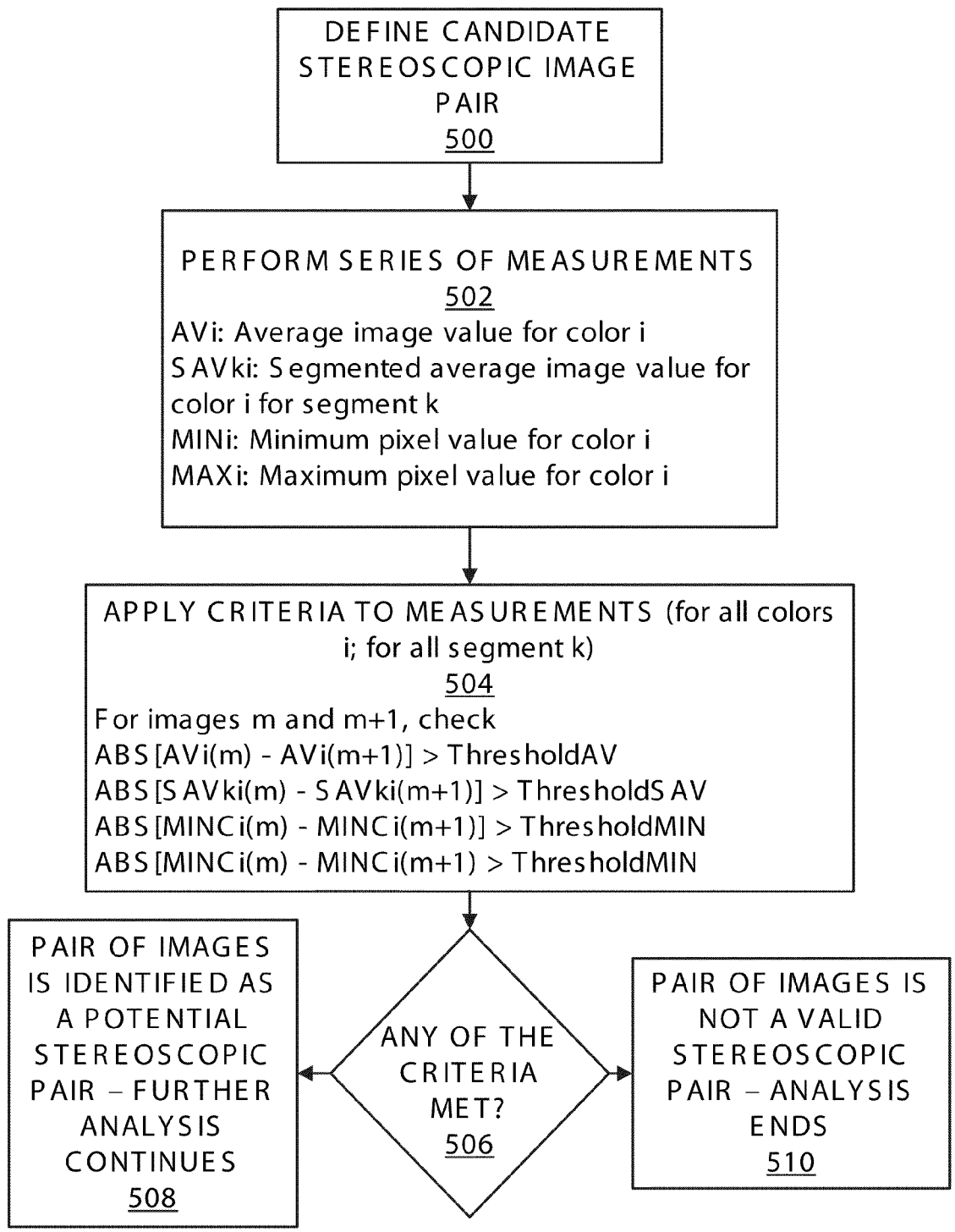
FIG. 5 is a flow chart of an exemplary method for a preliminary, quick analysis to pre-screen whether an image pair may be a valid stereoscopic pair in accordance with embodiments of the present invention.

A preliminary, quick analysis may be utilized for determining whether images among the plurality of captured images are similar enough to warrant a more detailed analysis. This analysis may be performed by, for example, the image generator function 114 shown in FIG. 1. FIG. 5 illustrates a flow chart of an exemplary method for a preliminary, quick analysis to pre-screen whether an image pair may be a valid stereoscopic pair in accordance with embodiments of the present invention. Referring now to FIG. 5, the method includes defining 500 a candidate stereoscopic pair. For example, the image generator function 114 may define the image with index m and the image m+1 as a candidate stereoscopic pair.

The method of FIG. 5 includes performing 502 a series of measurements of the candidate stereoscopic image pair. The measurements may be of attributes of the image pair. For example, for each color, the image generator function 114 may measure or calculate the following values:

Average image value $$AV = \left(\frac{1}{\text{image\_size}}\right) \sum_{i=1}^{\text{image\_size}} Ii$$

Segmented average image value: Divide image in k segments and take the average of those segments
Minimum pixel value for each color of the image (MIN)
Maximum pixel value for each color of the image (MAX)

The method of FIG. 5 includes applying 504 criteria to the measurements. For example, the image function generator 114 shown in FIG. 1 may apply several criteria for determining if the images are a possible stereoscopic pair. Exemplary equations defining the application of these criteria to the image m and image m+1 follow:

Image pair is not stereoscopic=$ABS(AV_m-AV_{m+1})>$ThresholdAV

OR

For all k, $ABS(SAV_{k,m}-SAV_{k,m-1})>$ThresholdSAV

OR $ABS(MAX_m-MAX_{m+1})>$ThresholdMAX

OR $ABS(MIN_m-MIN_{m+1})>$ThresholdMIN

ThresholdAV, ThresholdSAV, ThresholdMAX, and ThresholdMIN are threshold value levels for the average, segmented average, maximum and minimum, respectively. These equations can be applied to all or at least some of the colors.

The method of FIG. 5 includes determining 506 whether any of the criteria are met. The image generator function 114 may determine whether any of the criteria are met. If the differences between the values for each image are less than a defined threshold, analysis can continue using more complex techniques for determining whether the images are a suitable stereoscopic pair. For example, the method of FIGS. 6A-6C, described below, can be applied for determining whether the images are a suitable stereoscopic pair 508. Otherwise, if all the differences are greater than the defined threshold, the images are rejected as a stereoscopic pair 510.

Referring again to FIGS. 3A-3D, after images are determined to be a potential stereoscopic pair, the method includes applying 304 rudimentary color adjustment to the images. For example, the image generator function 114 shown in FIG. 1 may apply color adjustment to the images. This optional color adjustment can be a normalized adjustment or DC-correction applied to a single image to allow luminance-based techniques to work better. In addition, several additional criteria may typically be applied to the luminance planes (or optionally to all color planes), including, but not limited to, a Hough transform analysis 306, segmentation 308, edge detection 310, and the like. For example, segmented objects or blocks with high information content can be compared between the two image views using motion estimation techniques, based on differential error measures, such as, but not limited to, sum of absolute difference (SAD) or sum of squared errors (SSE), or correlation based measures, such as phase correlation or cross correlation. Rotational changes between the two images may be considered and identified during this procedure. Segmented objects that are in one view only are indicative of occlusion, and having a significant number of occluded regions is indicative of a poor image pair for stereoscopy. Regions of occlusion identified during this process are recorded for use in later parts of the conversion process. Similarly, motion vector displacement between matching objects may be recorded or stored for further use.

Using the results of the motion estimation process used for object similarity evaluation, vertical displacement can be assessed. Vertical motion vector components are indicative of vertical parallax between the images, which when large can indicate a poor image pair. Vertical parallax must be corrected via rectification and registration to allow for comfortable viewing, and this correction will reduce the size of the overlapping region of the image in proportion to the original amount of vertical parallax.

Using the motion vectors from the similarity of objects check, color data may be compared to search for large changes between images. Such large changes can represent a color difference between the images regardless of similar luminance.

Figure 6A:
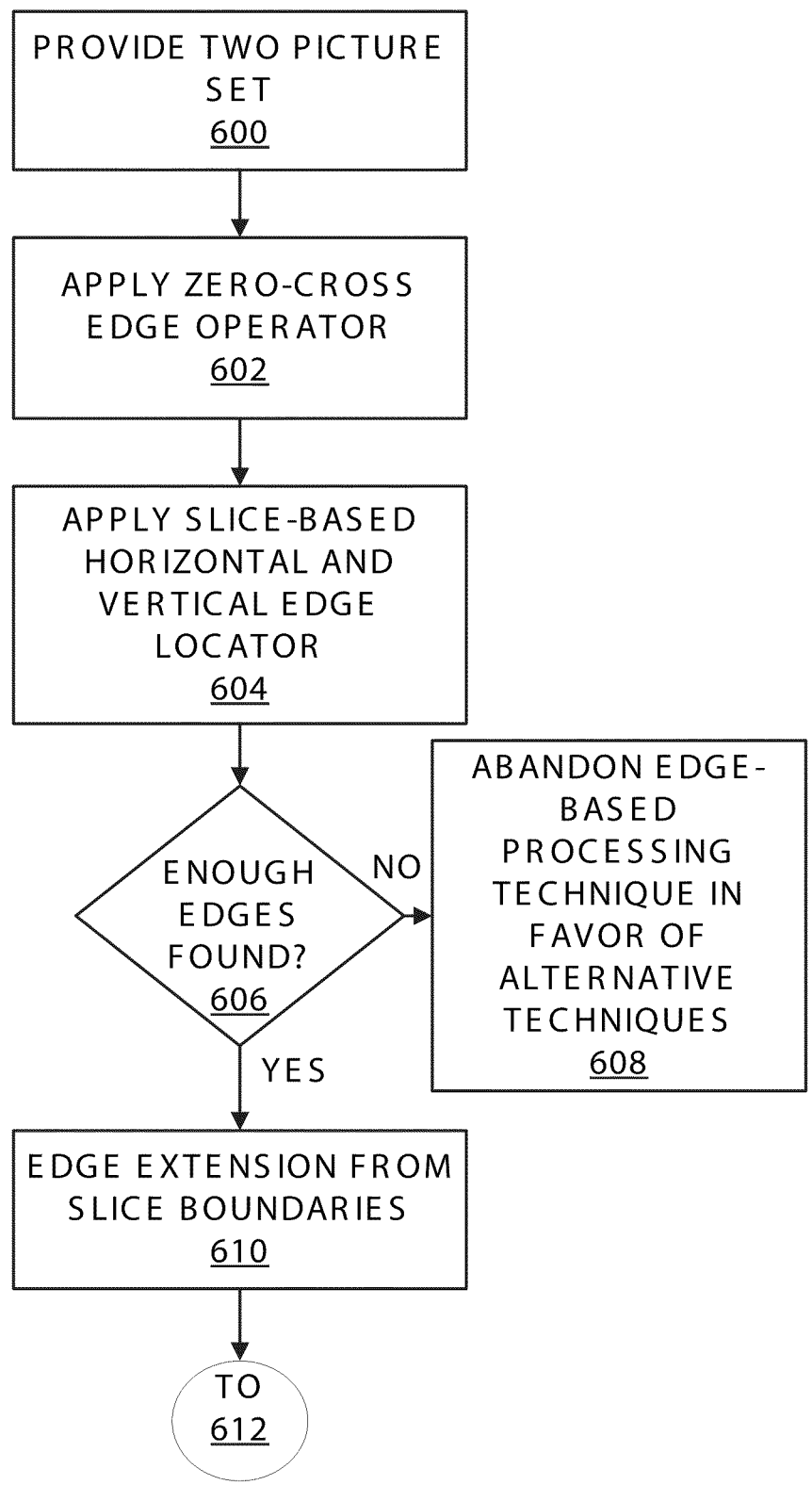
FIGS. 6A-6C are a flow chart of an exemplary method for edge-based analytics and matching for image correspondence, determination of right/left image, and camera toe-in/parallel plane configuration according to embodiments of the present invention.
Figure 6B:
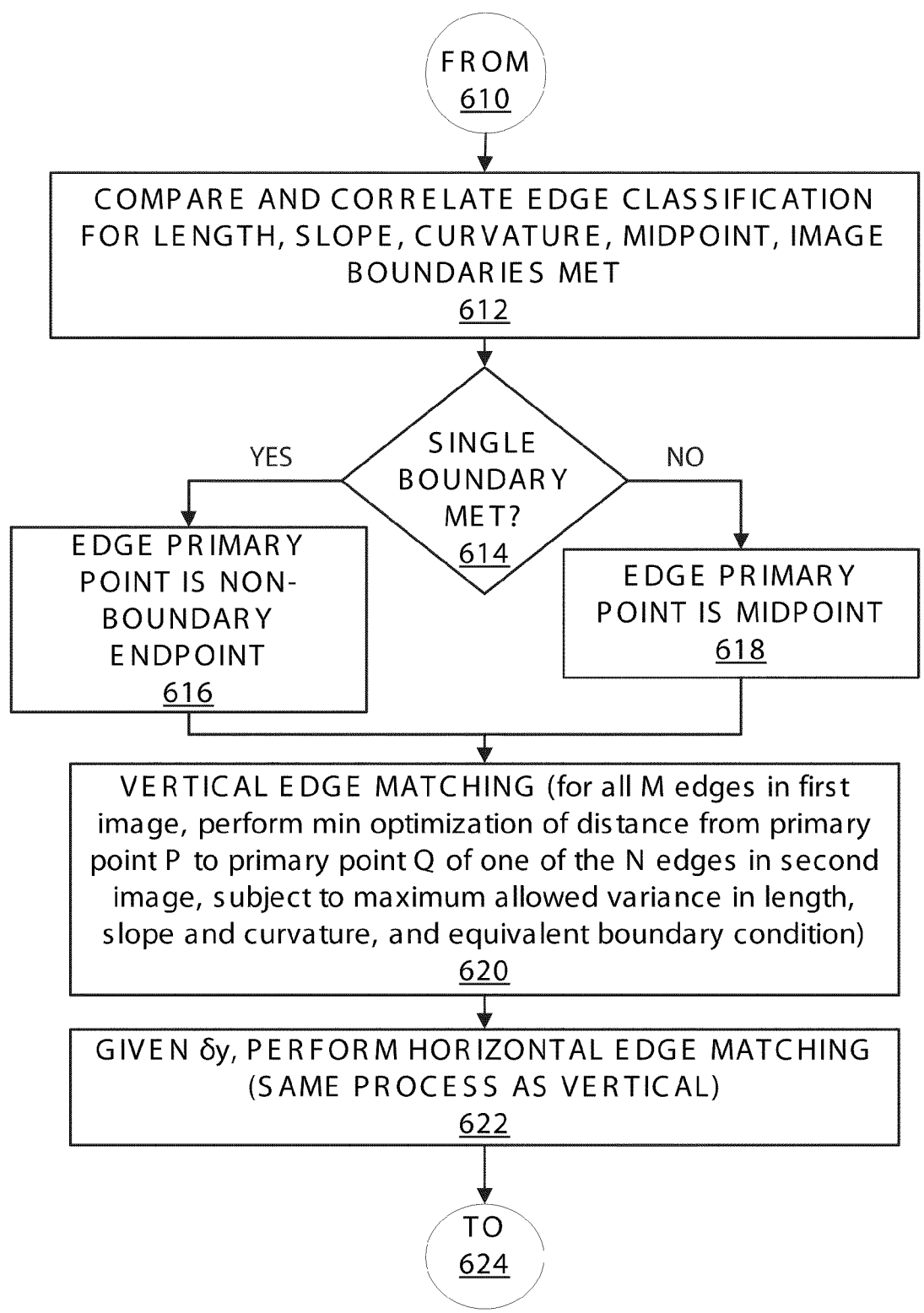
Figure 6C:
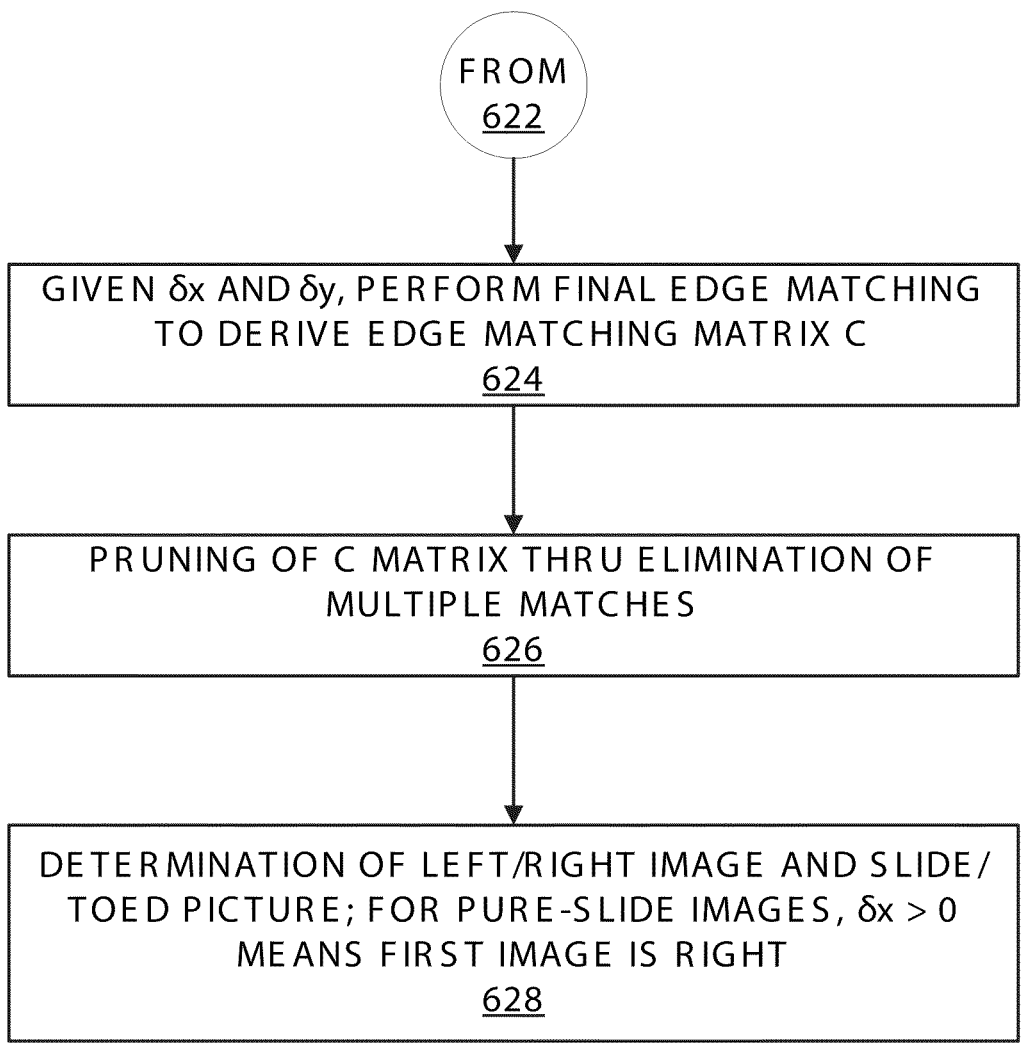

The method of FIGS. 3A-3D includes performing 312 edge-based analytics and matching for determining whether camera planes are parallel 313. For example, FIGS. 6A-6C illustrate a flow chart of an exemplary method for edge-based analytics and matching for image correspondence, determination of right/left image, and camera toe-in/parallel plane configuration according to embodiments of the present invention. This method may be implemented by the image generator function 114 shown in FIG. 1. Referring to FIGS. 6A-6C, two images are provided 600. Edge detection, when applied to both images, can be the foundation for image analysis and correspondence. In an example, the image generator function 114 shown in FIG. 1 may apply 602 numerous edge operators for this analysis. The edge operators may include, but are not limited to, zero-cross or gradient-based operations. Following the application of edge operators, the image generator function 114 may apply 604 a slice-based horizontal and vertical edge locator function for extracting edges from the binary images.

Referring to FIGS. 6A-6C, the image generator function 114 may also determine whether enough edges have been found 606. This stage (606) involves a comparison of the edges found from the two pictures to make sure that they meet a predefined minimum edge count. This stage also confirms the similarity of the two pictures by comparing the edge count of the two images to assure they are within a predefined percentage of each other. If enough edges have not been found, techniques alternative to edge-based processing techniques may be used 608. These techniques include motion-estimation-based image matching and quadrant-based or full-image based cross correlation of the input images. Edge extensions from slice boundaries can be generated 610 if enough edges have been found. This scheme simplifies the overall amount of calculation to determine the edges within the images by first considering edge segments that span a slice and then growing these edge segments to determine the exact edge size and endpoints. Next, the method of FIGS. 6A-6C includes comparing and correlating 612 the lengths, slope, curvature, midpoints/offset position, boundaries, and primary points of the resulting edges within the two images as an additional check of potential correspondence. Block 614 tests each edge to see if it intersects with a single image boundary (i.e., top, bottom, left or right boundary of image). In the event of an edge intersecting a single image boundary, block 616 classifies its primary point as the endpoint which is not on the boundary. Otherwise, block 618 classifies its primary point as the midpoint of the edge. Block 620 involves solving a minimization problem via vertical edge matching in order to determine the optimal selection for the vertical shift between the two images. In an example for block 620, the following equation may be used:

$$\min_{\delta_y=-\varepsilon_y}^{\varepsilon_y} \sum_{i=1}^{M} \min_{j=1}^{N} (\min(\|P_i(x, y+\delta_y) - Q_j(x, y)\|, \varepsilon_x + \varepsilon_y)$$

For each vertical edge in one image, determine the closest edge in the other image, subject to meeting criteria for length, slope and curvature. For distance, use the distance between the primary points. If this distance is larger than $\varepsilon$, it is deemed that no edge matches, and this edge contributes $\varepsilon$ to the cost function. The end result of the optimization is the determination of $\delta$, the optimal shift between the two images based on this vertical edge matching. In box 622, the same optimization process from box 620 is repeated; this time, however, is for horizontal edge matching, and utilizes the vertical $\delta$ already determined from box 620.

In an example for block 622, the following equation may be used:

$$\min_{\delta_x=-\varepsilon_x}^{\varepsilon_x} \sum_{i=1}^{M} \min_{j=1}^{N} \min(\|P_i(x+\delta_x, y+\delta_y) - Q_j(x, y)\|, \varepsilon_x + \varepsilon_y)$$

Block 624 then uses the calculated horizontal and vertical $\delta$'s to match each edge with its closest edge that meets the length, slope and curvature criteria. In an example for block 624, the following equation may be used:

$$C_{i,j} = \begin{cases} 1 & \text{if } P_i \text{ matches } Q_j \\ 0 & \text{otherwise} \end{cases}$$

The output of this stage is the matrix C, which has 1 in location i,j if edge i and j are matching edges and otherwise 0. This matrix is then pruned in Box 626 so that no edge is matched with multiple other edges. In the event of multiple matches, the edge match with minimal distance is used. Finally, in Box 628, the edge matches are broken down into regions of the image. The set of matching edges within each region are then characterized by the mean shift, and this mean shift is then the characteristic shift of the region. By examining the direction of the shifts of each subregion, it is thus possible to determine which picture is left and which is right. It is also possible to determine whether the second captured picture was captured with a focal axis parallel to the first picture. If not, there is some amount of toe-in or toe-out which can be characterized by the directional shifts of the subregions.

Referring to FIGS. 6A-6C, the extracted edge sets from the two input images can be compared as part of a minimal optimization, in order to solve for the optimal delta translation between images. This $\delta$ value allows for determination of which image is left and right, as well as whether the cameras were in parallel configuration. When the cameras focal axes are parallel (or near parallel), the algorithm (from FIGS. 3A-3D) can proceed to the image registration without performing image rectification.

Figure 7:
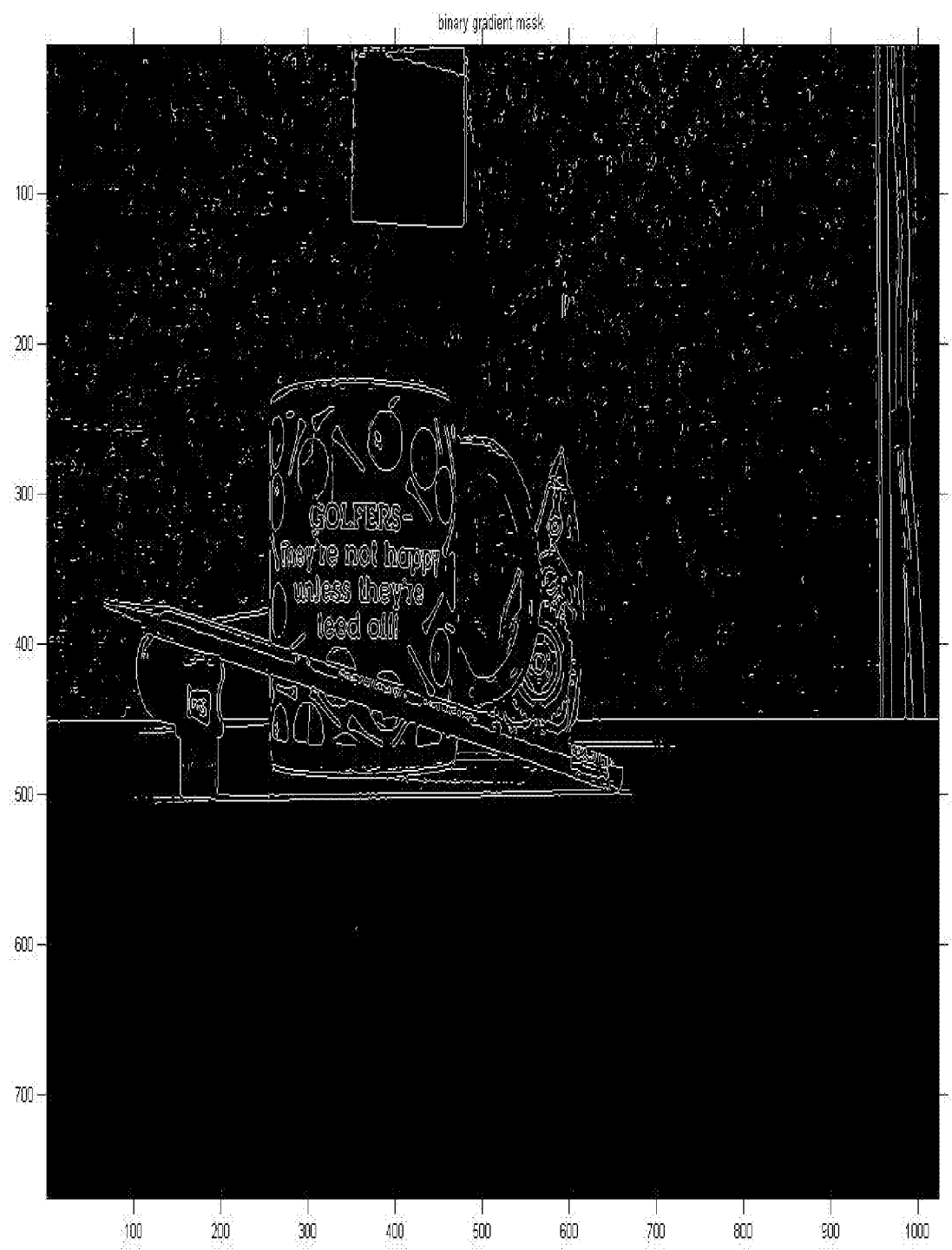
FIG. 7 is a graphical depiction of an edge detection example in accordance with embodiments of the present invention.

FIG. 7 is a graphical depiction of an edge detection example in accordance with embodiments of the present invention. The example of FIG. 7 shows the edge detection map when edge detection is applied to a captured image, and demonstrates that the extracted images can be a representation of image composition.

A Hough transform can be applied 306 to identify lines in the two images of the potential stereoscopic pair. Lines that are non-horizontal, non-vertical, and hence indicate some perspective in the image can be compared between the two images to search for perspective changes between the two views that may indicate a perspective change or excessive toe-in during capture of the pair.

The aforementioned criteria may be applied to scaled versions of the original images for reducing computational requirements. The results of each measurement may be gathered, weighted, and combined to make a final decision regarding the probable quality of a given image pair as a stereoscopic image pair.

Figure 8A:
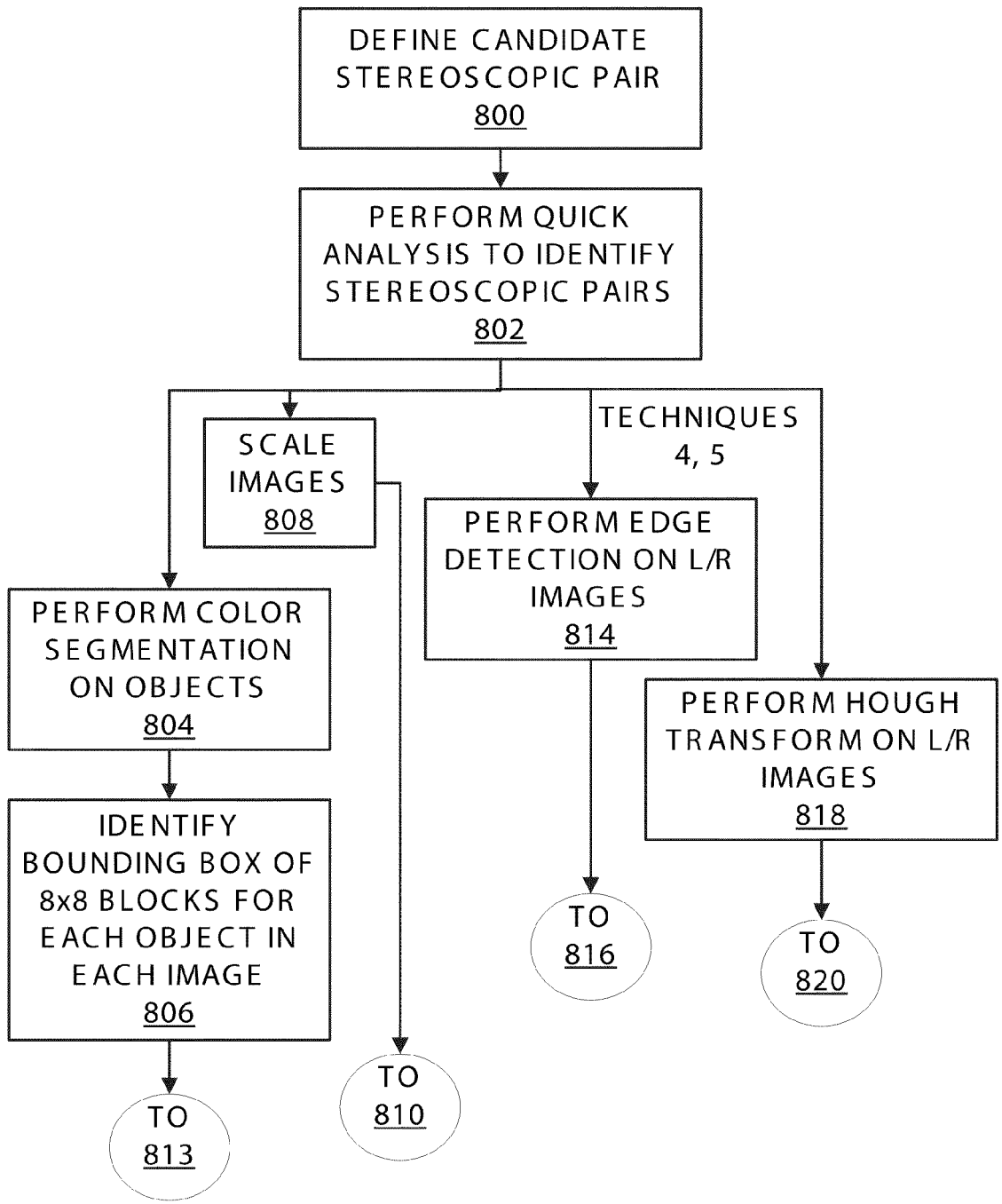
FIGS. 8A and 8B are a flow chart of an exemplary method for determining whether an image pair is a valid stereoscopic pair and which image is left and right according to embodiments of the present invention.
Figure 8B:
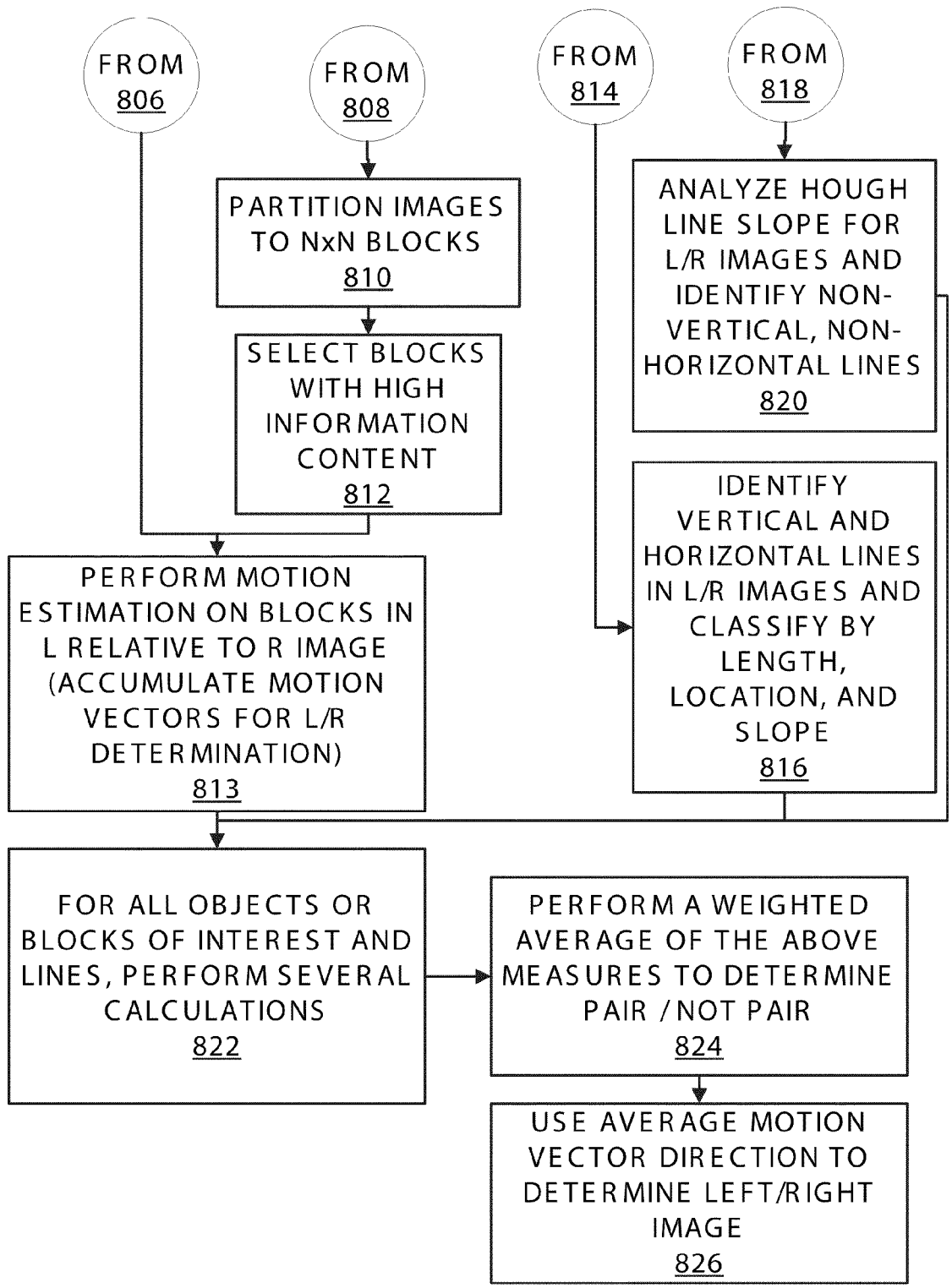

The method of FIGS. 3A-3D includes identifying 314 a valid stereoscopic pair. For example, FIGS. 8A and 8B illustrate a flow chart of an exemplary method for determining whether an image pair is a valid stereoscopic pair and which image is left and right according to embodiments of the present invention. This method may be implemented, for example, by the image generator function 114 shown in FIG. 1. Referring to FIGS. 8A and 8B, the method includes defining 800 a candidate stereoscopic image pair. In this example, two images with indices m and m+1 are examined. The method includes performing 802 a quick analysis to identify stereoscopic pairs.

At step 804, color segmentation is performed on the objects. At step 806, the bounding box of 8×8 blocks for each object in each image may be identified. At step 810, images may be partitioned into N×N blocks. At step 812, blocks with high information content may be selected. At step 813, the method includes performing motion estimation on blocks in L relative to R image (accumulate motion vectors for L/R determination. These steps may be considered Techniques 1, 2, and 3.

At step 814, edge detection may be performed on left/right images. Next, at step 816, vertical and horizontal lines in left/right images may be identified and may be classified by length, location, and slope. At step 818, a Hough transform may be performed on the left/right images. Next, at step 820, the method includes analyzing Hough line slope for left/right images and identifying non-vertical and non-horizontal lines.

Referring to FIGS. 8A and 8B, LDIAG represents the set of lines that have been identified as non-vertical or non-horizontal using the Hough transform. LHV represents lines that have been classified as either vertical or horizontal. MVY are the luminance motion vectors, and MVCRB the chrominance motion vectors, for each segmented object or N×N block. Similarly, MVYM is the mean luminance motion vector measurement, and MYCRBM the mean chrominance motion vectors. BMAD is the mean accumulated best match difference. ORG is the measurement of how well origins of horizontal/vertical lines match. LEN is the measurement of how well lengths of horizontal/vertical lines match. SLP is the measurement of how well slopes of horizontal/vertical lines match. TIN is the measurement of how well slopes of diagonal lines match.

At step 822, the following calculations may be performed for all objects or blocks of interest and lines:

$$MVYM = \sum_{i,j} MVY_{i,j,m},$$

where $i$: object ID, $j$: motion vector ID, $m$: image ID $$BMAD = \sum_{i} abs[block_{0,i,j,m} - block_{mv,i,j,m+1}],$$

where $i$: object ID, $j$: motion vector ID, $m$: image ID, $mv$: best match vector $f$ or block $j$ $$MVCRBM_{i,j} = \sum MVCRB_{i,j,m}$$

$$ORG = \sum_{i} abs[origin\ (LHV_{i,m}) - origin\ (LHV_{i,m+1})]$$

$$LEN = \sum_{i} abs[length\ (LHV_{i,m}) - length\ (LHV_{i,m+1})]$$

$$SLP = \sum_{i} abs[slope\ (LHV_{i,m}) - slope\ (LHV_{i,m+1})]$$

$$TIN = \sum_{i} abs[slope\ (LDIAG_{i,m}) - slope\ (LDIAG_{i,m+1})]$$

At step 824, a weighted average of the above measures may be performed to determine whether images are a pair or not. Next, at step 826, average motion vector direction may be used to determine left/right images.

Referring again to FIGS. 3A-3D, the method can next include determining which image of the stereoscopic pair represents the left view image and which image represents the right view image. This aspect can be important in many applications since, for example, a user can capture a plurality of images moving to the left or right. First, image segmentation 308 can be performed to identify objects within the two captured views. The motion estimation step that has been defined before saves the motion vectors of each object or block with high information content. If the general motion of segmented objects is to the right for one view relative to the other, it is indicative of a left view image, and vice versa. Since the process of motion estimation of segmented objects is also used in stereoscopic pair evaluation, left/right image determination can be performed in parallel.

For a stereo pair of left and right view images, the method of FIGS. 3A-3D includes rectification point selection 316, rectification 318, and region of interest identification 320. For example, interest points for stereo correspondence, rectification and registration can be identified. According to embodiments of the present invention, the left view image, sized N×M, is broken into a number, N, of smaller n×m sub-images. Each sub-image can be filtered to find junction points, or interest points, within and between objects in view. Interest points can be identified, for example, by performing horizontal and vertical edge detection, filtering for strong edges of a minimum length, and identifying crossing points of these edges. Interest point determination can be assisted by Hough transform line analysis when determining the dominant edges in a scene. Interest points may not be selected from areas identified as occluded in the initial analysis of a stereo pair. Interest points can span the full image.

Figure 9:
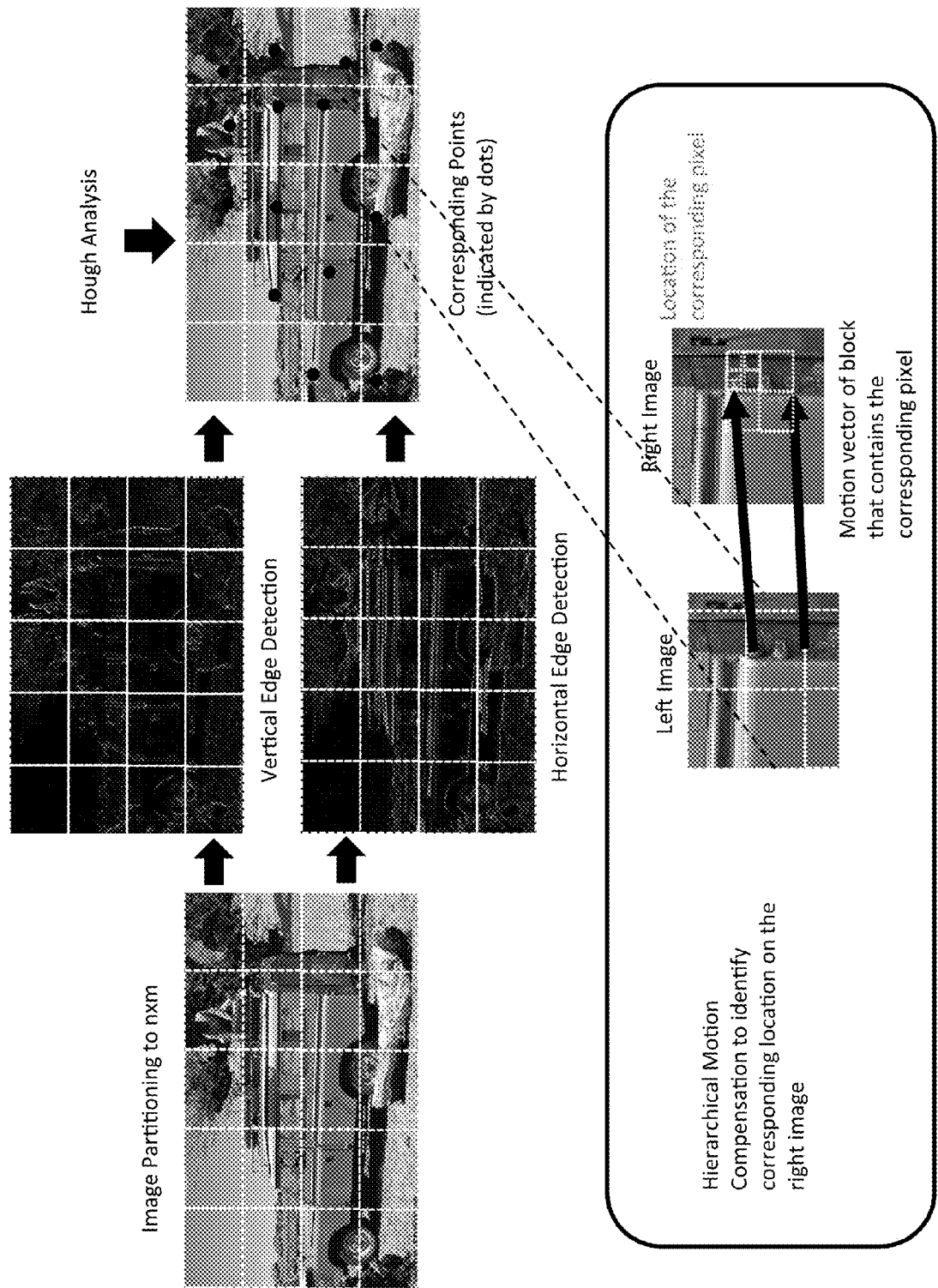
FIG. 9 is a diagram depicting a technique for identifying corresponding points in left and right view images in accordance with embodiments of the present invention.

For a stereo pair of left and right view images with a set of identified interest points, rectification 318 may be performed on the stereo pair of images. Using the interest point set for the left view image, motion estimation techniques (as described in stereo pair identification above) and edge matching techniques are applied to find the corresponding points in the right view image. FIG. 9 depicts an example of applying this technique. Referring to FIG. 9, the N corresponding points in the left and right view images are made into a 3×N set of point values, for example:

$$right_{pts} = \begin{Bmatrix} x1_r & x2_r & x3_r & \\ y1_r & y2_r & y3_r & ... \\ 1 & 1 & 1 & \end{Bmatrix} \text{ and } left_{pts} = \begin{Bmatrix} x1_l & x2_l & x3_l & \\ y1_l & y2_l & y3_l & ... \\ 1 & 1 & 1 & \end{Bmatrix},$$

and the fundamental matrix equation $$right_{pts}^T * F * left_{pts} = 0$$

is solved or approximated to determine the 3×3 fundamental matrix, F, and epipoles, e1 and e2. The camera epipoles are used with the interest point set to generate a pair of rectifying homographies. It can be assumed that the camera properties are consistent between the two captured images. The respective homographies are then applied to the right and left images, creating the rectified images. The overlapping rectangular region of the two rectified images is then identified, the images are cropped to this rectangle, and the images are resized to their original dimensions, creating the rectified image pair, right_r and left_r. The rectified image pair can be defined by the following equations:

$$right\_r = cropped(F * right)$$

$$left\_r = cropped(F * left)$$

For the stereo pair of "left_r" and "right_r" images, registration is next performed on the stereo pair. A set of interest points is required, and the interest point set selected for rectification (or a subset thereof) may be translated to positions relative to the output of the rectification process by applying the homography of the rectification step to the points. Optionally, a second set of interest points may be identified for the left_r image, and motion estimation and edge matching techniques may be applied to find the corresponding points in the right_r image. The interest point selection process for the registration operation is the same as that for rectification. Again, the N corresponding interest points are made into a 3×N set of point values as set forth in the following equations:

$$right\_r_{pts} = \begin{Bmatrix} x'1_r & x'2_r & x'3_r & \\ y'1_r & y'2_r & y'3_r & ... \\ 1 & 1 & 1 & \end{Bmatrix} \text{ and }$$

$$left\_r_{pts} = \begin{Bmatrix} x'1_l & x'2_l & x'3_l & \\ y'1_l & y'2_l & y'3_l & ... \\ 1 & 1 & 1 & \end{Bmatrix},$$

and the following matrix equation $$\text{left\_r}_{pts} = Tr * \text{right\_r}_{pts}$$

is approximated for a 3×3 linear conformal transformation, Tr, which may incorporate both translation on the X and Y axes and rotation in the X/Y plane. The transform Tr is applied to the right_r image to create the image "Right'" as defined by the following equation:

$$\text{Right'} = Tr * \text{right\_r},$$

where right_r is organized as a 3×N set of points $(xi_r, yi_r, 1)$ for i=1 to image_rows*image cols.

Finally, the second set of interest points for the left_r image may be used to find correspondence in the Right' image, the set of points as set forth in the following equations:

$$Right'_{pts} = \begin{Bmatrix} x'1_r & x'2_r & x'3_r & \\ y'1_r & y'2_r & y'3_r & \ldots \\ 1 & 1 & 1 & \end{Bmatrix} \text{ and}$$

$$\text{left\_r}_{pts} = \begin{Bmatrix} x'1_l & x'2_l & x'3_l & \\ y'1_l & y'2_l & y'3_l & \ldots \\ 1 & 1 & 1 & \end{Bmatrix},$$

is identified and composed, and the equation $$\text{Right'}_{pts} = Tl * \text{left\_r}_{pts}$$

is approximated for a second linear conformal transformation, Tl. The transform Tl is applied to the left_r image to create the image "Left'", as defined by the following equation:

$$\text{Left'} = Tl * \text{left\_r}$$

"Right'" and "Left'" images represent a rectified, registered stereoscopic pair.

The method of FIGS. 3A-3D includes an overall parallax, or disparity, calculation 332. According to embodiments of the present invention, for a stereoscopic pair of registered "Left'" and "Right'" images, a pixel-by-pixel parallax, or disparity, map is created. This can be performed, for example, by using a hierarchical motion estimation operation between the Left' and Right' images, starting with blocks sized N×N and refining as necessary to smaller block sizes. During the estimation process, only horizontal displacement may be considered, limiting the search range. After each iteration of the process, the best match position is considered for pixel-by-pixel differences, and the next refinement step, if needed, is assigned by noting the size of the individual pixel differences that are greater than a threshold, Tp. Regions of the image previously identified as occluded in one image are assigned the average parallax value of the pixels in the surrounding neighborhood. Regions of an image that are not known to be occluded from previous steps in the process, and for which an appropriate motion match cannot be found (pixel differences are never<Tp) are assigned to the maximum possible parallax value to allow for simple identification in later steps of the stereo composition process. In the example of FIGS. 3A-3D, the method includes correspondence point selection 322, correspondence 324 and registration transform to generate the Right' image 326. In addition, the method includes correspondence 328 and registration transform to generate the Left' image 330.

Figure 10:
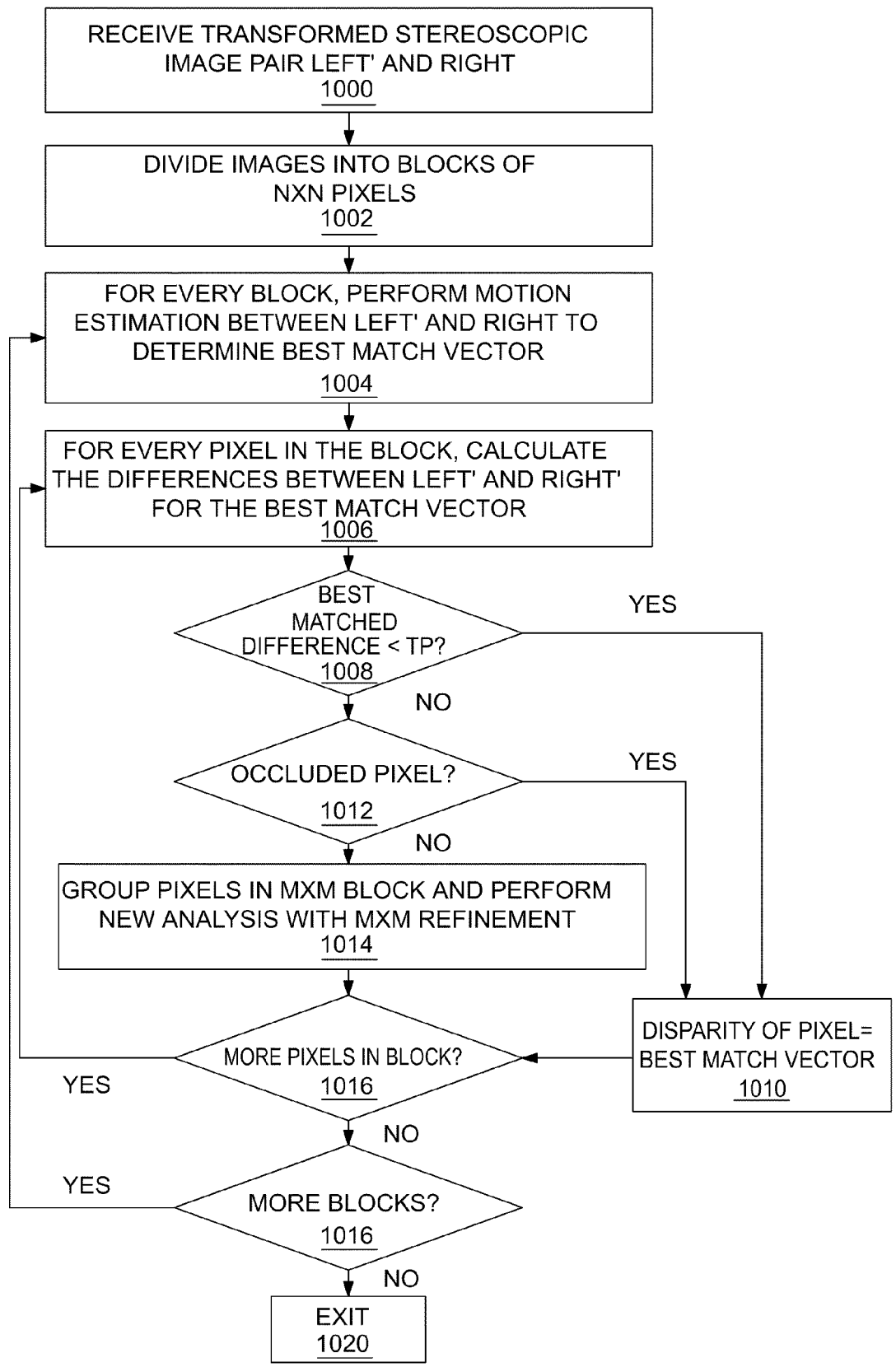
FIG. 10 is a flow chart of an exemplary method for determining pixel disparities according to embodiments of the present invention.

FIG. 10 illustrates a flow chart of an exemplary method for determining pixel disparities according to embodiments of the present invention. The method may be implemented, for example, by the image generator function 114 shown in FIG. 1. Referring to FIG. 10, the method includes receiving 1000 a transformed stereoscopic image pair, including a left and right image. The method includes dividing 1002 the images into blocks of N×N pixels. For every block, the method includes performing 1004 motion estimation between left and right to determine a best match vector. Next, for every pixel in each block, the method includes calculating 1006 the differences between left and right for the best match vector.

The method of FIG. 10 includes determining 1008 whether the best match difference is less than the threshold Tp. If the best match difference is less than the threshold Tp, the disparity of the pixel is set equal to the best match vector 1010. Otherwise, if the best match difference is not less than the threshold Tp, the method includes determining 1012 whether the pixel is occluded. If the pixel is determined to be occluded, the disparity of the pixel is set equal to the best match vector 1010. If the pixel is determined not to be occluded, the method includes grouping pixels in an M×M block and performing a new analysis with M×M refinement 1014.

After steps 1010 and 1014 of FIG. 10, the method includes determining 1016 whether there are more pixels in the current block being processed. If there are more pixels, the method returns to step 1006. Otherwise, the method determines 1018 whether there are more blocks to be processed. If not, the method exits 1020. If there are more blocks, the method returns to step 1004.

Returning now to FIGS. 3A-3D, the method includes applying 334 a parallax analysis. For example, for a stereoscopic pair of registered "Left'" and "Right'" images, the maximum and minimum pixel parallax values can be analyzed to decide whether the maximum or minimum parallax is within the ability of a viewer to resolve a three-dimensional image. If it is determined that the parallax is within the ability of a viewer to resolve the three-dimensional image, the method proceeds to step 342. If not, the method proceeds to step 336. Occluded regions and pixels with "infinite" parallax are not considered in this exemplary method.

For a stereoscopic pair of registered "Left'" and "Right'" images, the screen plane of the stereoscopic image can be altered 336, or relocated, to account for disparities measured as greater than a viewer can resolve. This is performed by scaling the translational portion of transforms that created the registered image views by a percent offset and re-applying the transforms to the original images. For example, if the initial left image transform is as follows:

$$Tl = \begin{Bmatrix} S*\cos\theta & S*\sin\theta & Tx \\ -S*\sin\theta & S*\cos\theta & Ty \\ 0 & 0 & 1 \end{Bmatrix}$$

for scaling factor S, X/Y rotation angle θ, and translational offsets Tx and Ty, the adjustment transform becomes $$Tl_{alt} = \begin{Bmatrix} S*\cos\theta & S*\sin\theta & Tx*Xscale \\ -S*\sin\theta & S*\cos\theta & Ty*Yscale \\ 0 & 0 & 1 \end{Bmatrix}$$

where Xscale and Yscale are determined by the desired pixel adjustment relative to the initial transform adjustment, i.e., $$Xscale = 1 + \frac{(\text{desired\_pixel\_adjustment})}{Tx}.$$

Only in rare occurrences will Yscale be other than zero, and only then as a corrective measure for any noted vertical par allax. Using the altered transform, a new registered image view is created, e.g. the following:

$$\text{Left}' = Tl_{alt} * \text{left\_r}$$

Such scaling effectively adds to or subtracts from the parallax for each pixel, effectively moving the point of now parallax forward or backward in the scene. The appropriate scaling is determined by the translational portion of the transform and the required adjustment.

At step 338 of FIGS. 3A-3D, it is determined whether the parallax is within the ability of a viewer to resolve the three-dimensional image. If it is determined that the parallax is within the ability of a viewer to resolve the three-dimensional image, the method proceeds to step 342. If not, the method proceeds to step 340. For a stereoscopic pair of registered "Left'" and "Right'" images, the pixel-by-pixel parallax for pixels of segmented objects may also be adjusted 340, or altered, which effectively performs a pseudo-decrease (or increase) in the parallax of individual segmented objects for objects that still cannot be resolved after the screen adjustments above. This process involves the same type of manipulation and re-application of a transform, but specific to a given region of the picture, corresponding to the objects in question.

Since moving an object region in the image may result in a final image that has undefined pixel values, a pixel-fill process is required to ensure that all areas of the resultant image have defined pixel values after object movement. An exemplary procedure for this is described below. Other processes, both more or less complex, may be applied.

Figure 11:
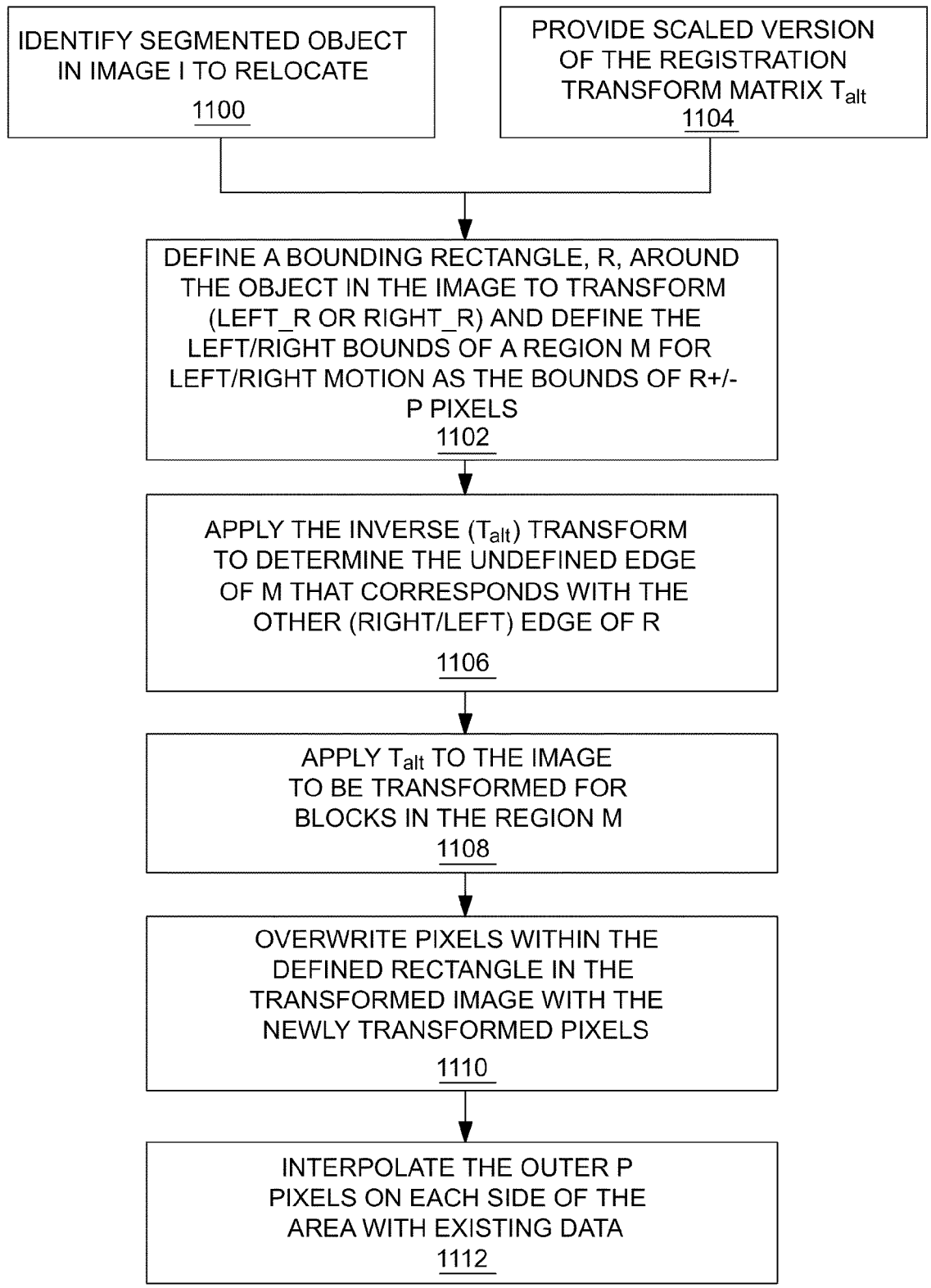
FIG. 11 is a flow chart of an exemplary method for adjusting parallax of segmented, moving objects according to embodiments of the present invention.
Figure 12:
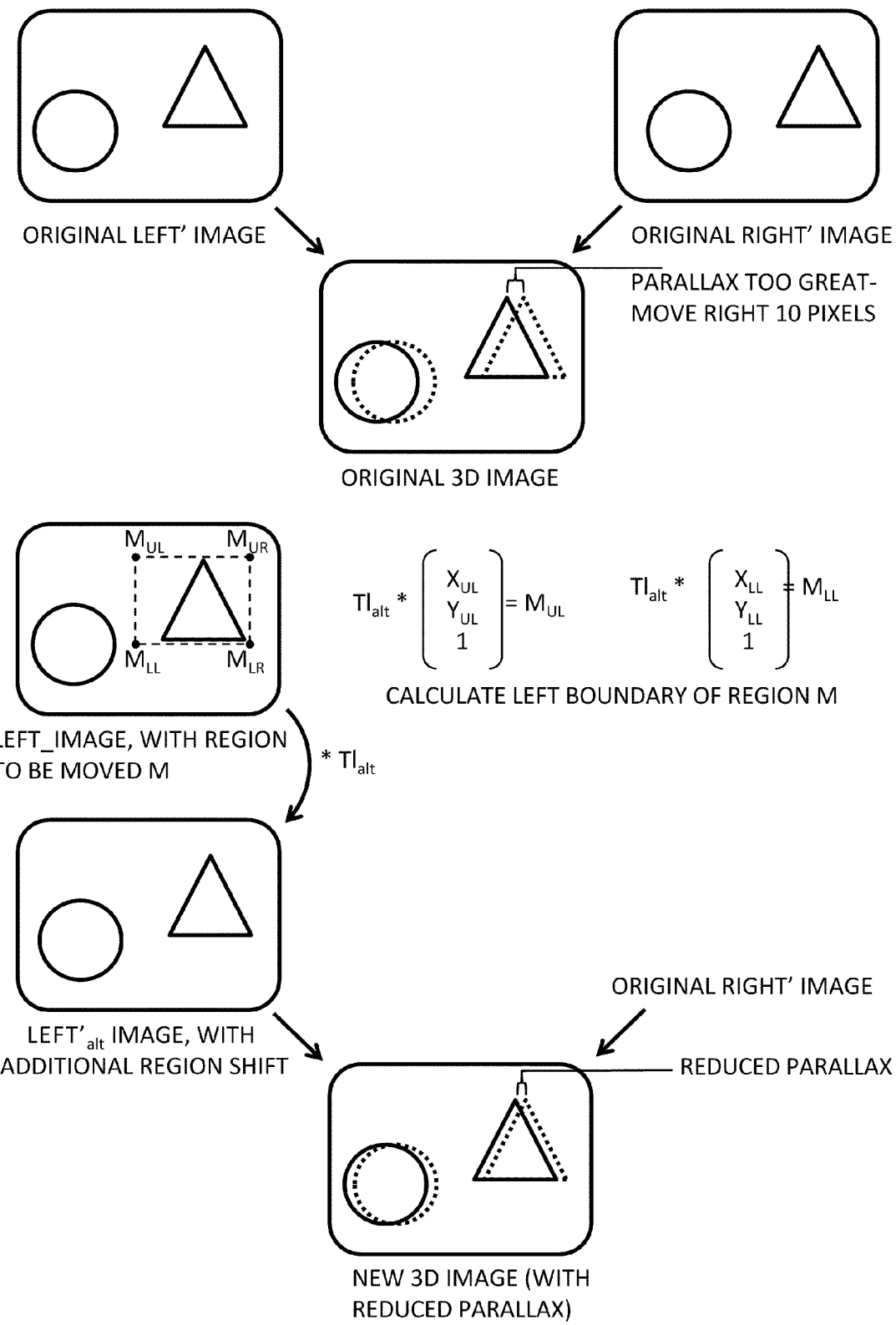
FIG. 12 is an exemplary diagram of a method for adjusting parallax of moving, segmented objects according to embodiments of the present invention.

FIG. 11 illustrates a flow chart of an exemplary method for adjusting parallax of segmented, moving objects according to embodiments of the present invention. Further, FIG. 12 illustrates an exemplary diagram of a method for adjusting parallax of moving, segmented objects according to embodiments of the present invention. The method may be implemented, for example, by the image generator function 114 shown in FIG. 1. Referring now to FIG. 11, the method includes identifying 1100 a segmented object in an image I to relocate. The method of FIG. 11 also includes defining a bounding rectangle R around the object and defining left/right bounds of a region M for left/right motion 1102. In an example of defining the bounding rectangle R, the segmented region to be moved may be identified as a rectangular region of pixels, R, in the left_r or right_r image (whichever is to be altered), sized X columns by Y rows with the following coordinates:

$$R_{ul} = (x_l, y_u); \text{ the upper left coordinate}$$

$$R_{ll} = (x_l, y_l); \text{ the lower left coordinate}$$

$$R_{ur} = (x_r, y_u); \text{ the upper right coordinate}$$

$$R_{lr} = (x_r, y_l); \text{ the lower right coordinate}$$

For a large or complex object, multiple rectangular regions may need to be defined and moved, but the process executes identically for each region.

In an example of defining left/right bounds of a region M for left/right motion, the region M is the region to which the altered transform can be applied. This process first assesses the direction of movement to occur and defines one side of region M. If the intended movement is to the right, then the right bounding edge of region M is defined by the following coordinate pair in the appropriate left_r or right_r image (whichever is to be adjusted):

$$M_{ur} = (x_r + P, y_u); \text{ upper right}$$

$$M_{lr} = (x_r + P, y_l); \text{ lower right}$$

If movement is to the left, the left bounding edge of region M is defined as:

$$M_{ul} = (x_l - P, y_u); \text{ upper left}$$

$$M_{ll} = (x_l - P, y_l); \text{ lower left}$$

P is an extra number of pixels for blending purposes. The scaled version of the registration transform matrix $T_{alt}$ is provided 1104. The inverse of the altered transform (assumed already calculated as above for movement of the screen plane for the whole image) may then be applied 1106 to the opposite edge of the region R to get the other edge of region M. For the sake of example, assume that the movement of R is intended to be to the right, and that the left image is to be altered (meaning $Tl_{alt}$ has been created for the intended movement). Since the right side of M is already known, the other side can now be determined as:

$$M_{ul} = Tl_{alt}^{-1} * R_{ul} + (P,0); \text{ upper right}$$

$$M_{ll} = Tl_{alt}^{-1} * R_{ll} + (P,0); \text{ lower right}$$

Again, P is an extra number of pixels for blending, and $Tl_{alt}^{-1}$ is the inverse transform of $Tl_{alt}$. Note that P is added after the transform application, and only to the X coordinates. The region to be moved is now defined as the pixels within the rectangle defined by M.

The method also includes applying 1108 the inverse transform of $Tl_{alt}$ to the image to be transformed for blocks in the region M. For example, from this point, one of two operations can be used, depending on a measurement of the uniformity (texture) or the area defined by the coordinates $M_{ul}$, $M_{ll}$, $R_{ul}$, and $R_{ll}$ (remembering again that the region would be using other coordinates for a movement to the left). Uniformity is measured by performing a histogram analysis on the RGB values for the pixels in this area. If the pixel variation is within a threshold, the area is deemed uniform, and the movement of the region is affected by applying the following equation: Left'=$Tl_{alt}$*left_r, for left_r ∈M. This is the process shown in the example method of FIG. 12. Alternatively, if the area is not uniform, movement of the object is applied to the smaller area:

$$\text{Left}' = Tl_{alt} * \text{left\_r}; \text{ for the left\_r region defined by } R_{ul}, R_{ll}, M_{ur}, \text{ and } M_{lr}.$$

The method of FIG. 11 includes overwriting 1110 pixels within the defined rectangle in the transformed image with the newly transformed pixels.

The method of FIG. 11 includes interpolating the outer P pixels on each side of the area with existing data. For example, the area in Left' defined by the coordinates $M_{ul}$, $M_{ll}$, $R_{ur}$, and $R_{lr}$ will be empty, but is filled with a linear gradient fill between points on each horizontal line in the region. The fill-in process first determines the following distance d:

$$d = R_{ul}(x) - M_{ul}(x)$$

for the x-coordinates of $R_{ul}$ and $M_{ul}$, and then proceeds to determine an interpolated gradient between the two pixel positions to fill in the missing values. For simplicity of implementation, the interpolation is always performed on a power of two, meaning that the interpolation will produce one of 1, 2, 4, 8, 16, etc. pixels as needed between the two defined pixels. Pixel regions that are not a power of two are mapped to the closest power of two, and either pixel repetition or truncation of the sequence is applied to fit. As an example, if $R_{ul}(x)=13$ and $M_{ul}(x)=6$, then d=7, and the following inter mediate pixel gradient is calculated for a given row, j, in the region:

$$p1 = \frac{7}{8} * (x_6, y) + \frac{1}{8} * (x_{13}, y)$$

$$p2 = \frac{6}{8} * (x_6, y) + \frac{2}{8} * (x_{13}, y)$$

$$p3 = \frac{5}{8} * (x_6, y) + \frac{3}{8} * (x_{13}, y)$$

$$p4 = \frac{4}{8} * (x_6, y) + \frac{4}{8} * (x_{13}, y)$$

$$p5 = \frac{3}{8} * (x_6, y) + \frac{5}{8} * (x_{13}, y)$$

$$p6 = \frac{2}{8} * (x_6, y) + \frac{6}{8} * (x_{13}, y)$$

$$p7 = \frac{1}{8} * (x_6, y) + \frac{7}{8} * (x_{13}, y)$$

$$p8 = (x_{13}, y)$$

Since only 7 values are needed, p8 would go unused in this case, such that the following assignments would be made:

$(x_6, y_j) = p1$ $(x_7, y_j) = p2$ $(x_8, y_j) = p3$ $(x_9, y_j) = p4$ $(x_{10}, y_j) = p5$ $(x_{11}, y_j) = p6$ $(x_{12}, y_j) = p7$.

This process can repeat for each row in the empty region.

A weighted averaging the outer P "extra" pixels on each side of the rectangle with the pixel data currently in those positions is performed to blend the edges.

As an alternative to the procedure of applying movement and pixel blending to alter the parallax of an object, the disparity map calculated using the two views, "Left'" and "Right'," can be altered for the region M to reduce the disparity values in that region, and then applied to one of the "Left'" or "Right'" single image views to create a new view (e.g., "Left_disparity"). The result of this process is a new stereo pair (e.g., "Left" and "Left_disparity") that recreates the depth of the original pair, but with lesser parallax for the objects within the region M. Once created in this manner, the "disparity" view becomes the new opposite image to the original, or for example, a created "Left_disparity" image becomes the new "Right'" image.

Returning to FIGS. 3A-3D, the method includes performing 342 depth enhancements. For example, for a stereoscopic pair of registered "Left'" and "Right'" images, the screen plane of the stereoscopic image may be relocated to allow a viewer to emphasize or de-emphasize object depth in the three-dimensional image. This relocation may be implemented to enhance the subjective quality of the displayed image or to create three-dimensional effects that involve changing object depth over time to simulate motion. The process for this uses the same procedures as for general readjustment of the screen plane, and for segmented object specific adjustments, but is performed voluntarily for effect, rather than necessarily for correction.

The method of FIGS. 3A-3D includes removing 344 moving objects. For example, for a stereoscopic pair of registered "Left'" and "Right'" images, disparity differences can be identified which indicate object motion within, into, or out of the image frame for one image. These areas can be identifiable as those which have "infinite" parallax assignments from the disparity map step of the process. Areas indicating such motion are replicated or removed using data from the other image view and/or other views captured between the "Left" and "Right" images. Without any loss of generality, we will assume that first picture taken is the leftmost, and the last picture taken is the rightmost. In actuality, the opposite can occur. In the following description the following definitions apply:

First picture: the first picture captured in the sequence (1)
Last picture: the last picture captured in the sequence (N)
Leftmost pictures: any set of pictures from $1^{st}$ to N−1
Rightmost pictures: any set of pictures from $2^{nd}$ to Nth
Left target picture: any of the leftmost pictures or a modified version of all captured pictures that will be used during the 3D generation process as left picture
Right target picture: any of the rightmost pictures or a modified picture that will be used during the 3D generation process as right picture The method of identifying and compensating for moving objects consists of the following steps. For a given sequence of pictures captured between two positions, divide each picture into smaller areas and calculate motion vectors between all pictures in all areas. Calculate by a windowed moving average the global motion that results from the panning of the camera. Then subtract the area motion vector from the global motion to identify the relative motion vectors of each area in each picture. If the motion of each area is below a certain threshold, the picture is static and the first and last picture, or any other set with the desired binocular distance, can be used as left and right target pictures to form a valid stereoscopic pair that will be used for registration, rectification, and generation of a 3D picture. If the motion of any area is above an empirical threshold, then identify all other areas that have zero motion vectors and copy those areas from any of the leftmost pictures to the target left picture and any of the rightmost pictures to the target right picture.

For objects where motion is indicated and where the motion of an object is below the acceptable disparity threshold, identify the most suitable image to copy the object from, copy the object to the left and right target images and adjust the disparities as shown in the attached figure. The more frames that are captured, the less estimation is needed to determine the rightmost pixel of the right view. Most of occluded pixels can be extracted from the leftmost images. For an object that is moving in and out of the scene between the first and last picture, identify the object and completely remove it from the first picture if there is enough data in the captured sequence of images to fill in the missing pixels.

For objects where motion is indicated and where the motion is above the acceptable disparity, identify the most suitable picture from which to extract the target object and extrapolate the proper disparity information from the remaining captured pictures.

The actual object removal process involves identifying N×N blocks, with N empirically determined, to make up a bounding region for the region of "infinite" parallax, plus an additional P pixels (for blending purposes), determining the corresponding position of those blocks in the other images using the parallax values of the surrounding P pixels that have a similar gradient value (meaning that high gradient areas are extrapolated from similar edge areas and low gradient areas are extrapolated from similar surrounding flat areas), copying the blocks/pixels from the opposite locations to the intended new location, and performing a weighted averaging of the outer P "extra" pixels with the pixel data currently in those positions to blend the edges. If it is determined to remove an object, fill-in data is generated 346. Otherwise, the method proceeds to step 348.

Figures 13A, 13B, 13C:
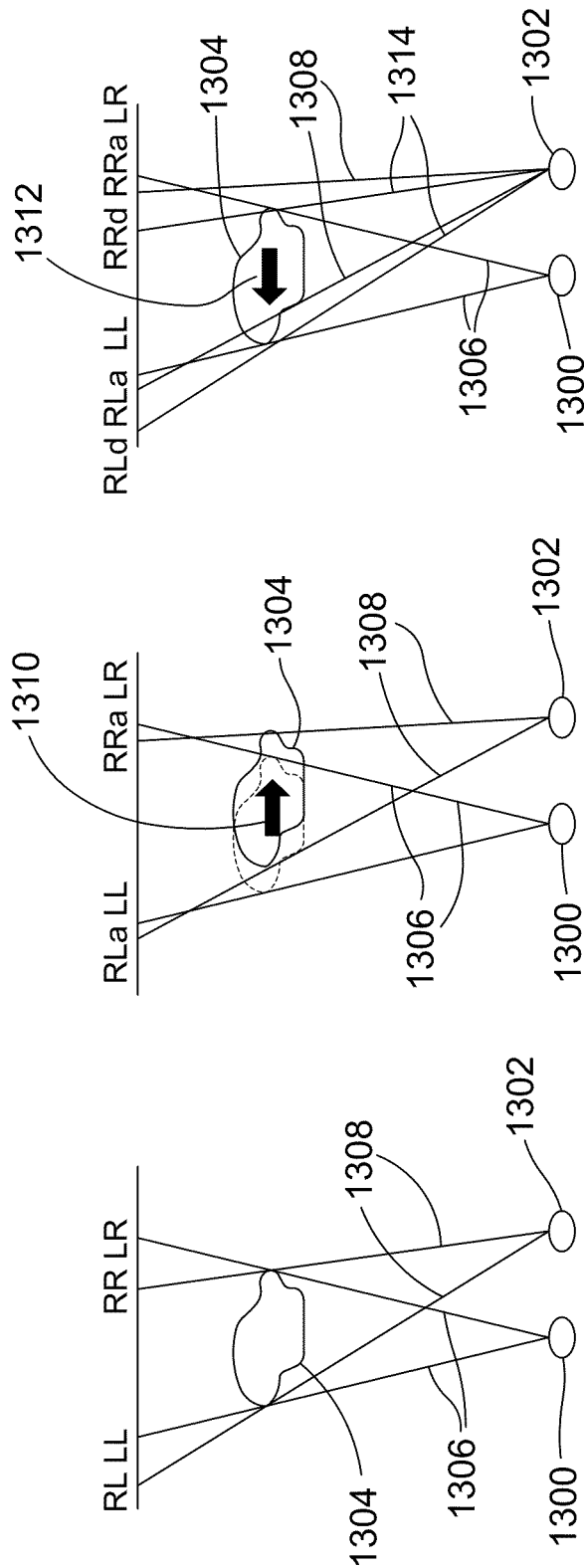
FIGS. 13A, 13B, and 13C illustrate an exemplary process for disparity interpolation according to embodiments of the present invention

FIGS. 13A, 13B, and 13C illustrate an exemplary process for disparity interpolation according to embodiments of the present invention. Referring to FIGS. 13A, 13B, and 13C, positions 1300 and 1302 are positions of a camera (not shown) when capturing images of object 1304 at different times. The image captured at position 1300 was captured prior to the image captured at position 1302. A view of the object 1304 from position 1300 is indicated by lines 1306, and a view of the object 1304 from position 1302 is indicated by lines 1308. As shown by direction arrow 1310 in FIG. 13B, the object 1304 is moving from left to right across the camera's view. Between the image capture times, the object 1304 has moved from a position 1304A (shown in a broken line) to the position 1304 shown in FIG. 13B) as shown in FIG. 13B.

The movement of the object 1304 is such that the disparity is unacceptable and should be corrected. In this example, the image obtained from position 1300 can be utilized for creating a three-dimensional image, and the image obtained from position 1302 can be altered for use together with the other image in creating the three-dimensional image. To correct, the object 1304 may be moved to the left (as indicated by direction arrow 1312 in FIG. 13C) in the image captured from position 1302. The object 1304 may be moved to the left to a position of a desired left view (i.e., the positioning of the object 1304 within the view from position 1302 as indicated by lines 1314 shown in FIG. 13C. The desired left image for the three-dimensional image may be composed by reducing visibility of the left-most pixel from RLa to RLd; and by increasing visibility of the right-most pixel by interpolating the [RRd, RRa] area from pixels found in the right-most of RRa.

Figure 14:
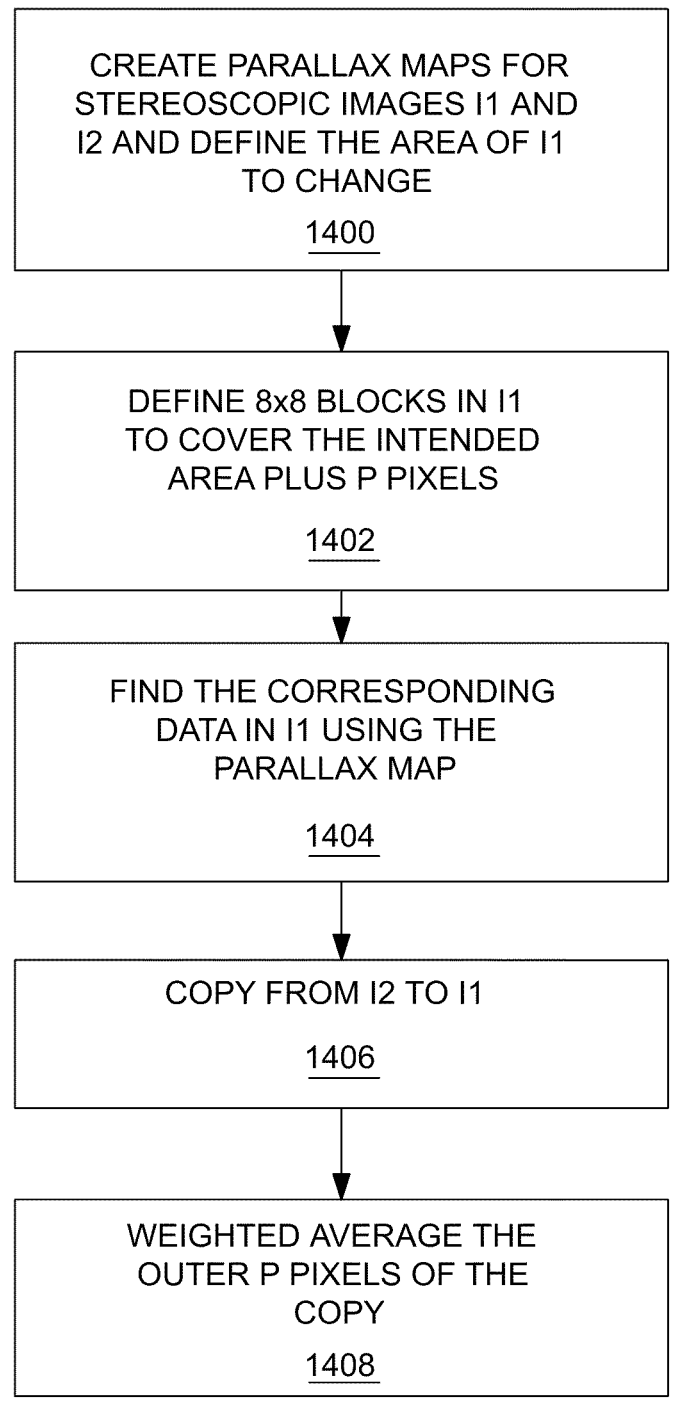
FIG. 14 is a flow chart of an exemplary method for adding/removing objects from a single image according to embodiments of the present invention.
Figure 15:
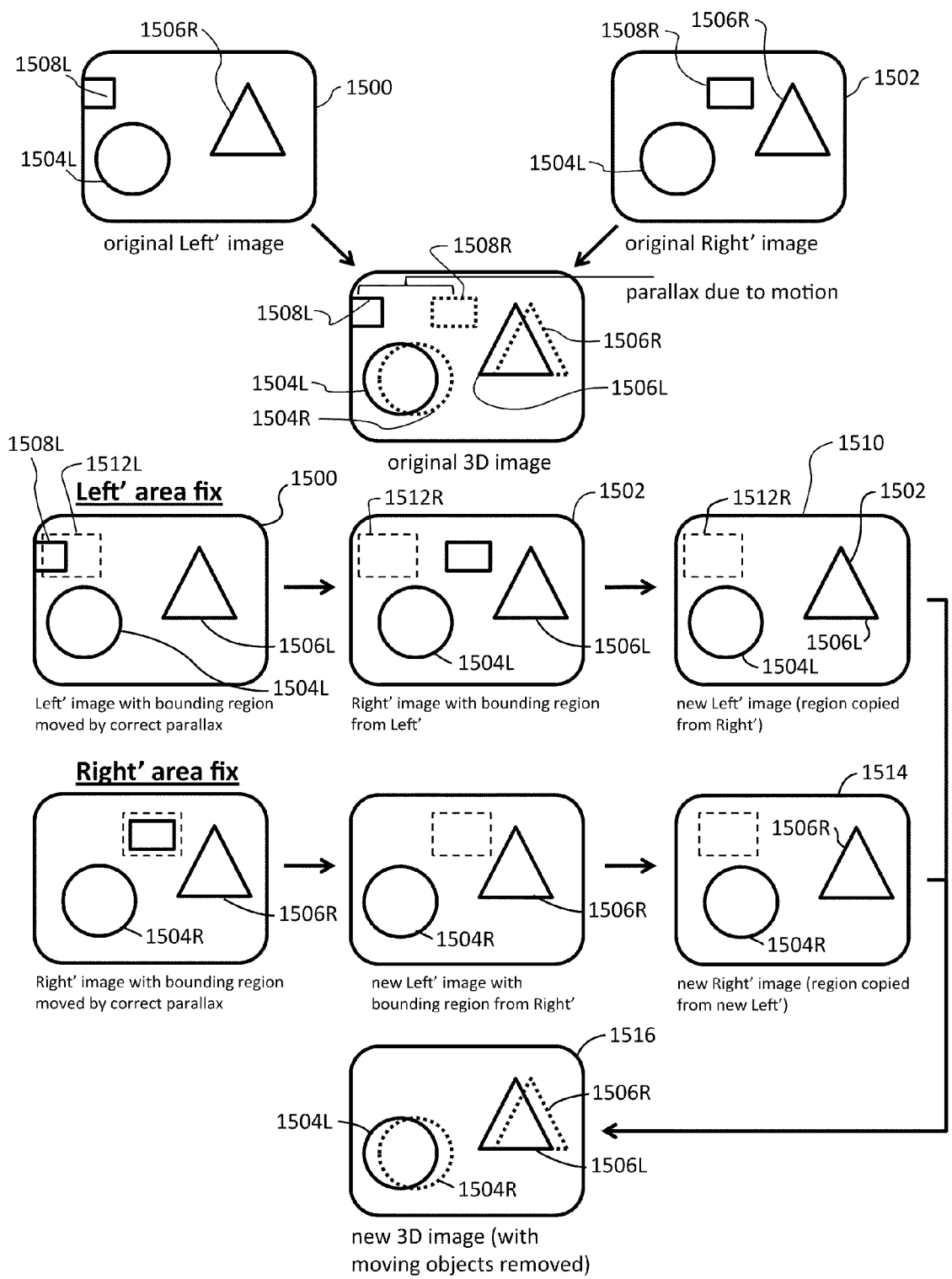
FIG. 15 is an exemplary diagram of a process for adding/removing objects from a single image according to embodiments of the present invention.

Another example of a process for adding/removing objects from a single image is illustrated in FIGS. 14 and 15. FIG. 14 illustrates a flow chart of an exemplary method for adding/removing objects from a single image according to embodiments of the present invention. Referring to FIG. 14, the method includes creating parallax maps for stereoscopic images I1 and I2 and defining the area of image I1 to change (step 1400). The method of FIG. 13 also includes defining 1402 8×8 blocks in image I1 to cover the intended area plus P pixels. Using the parallax map, the corresponding data in image I2 is found (step 1404). The corresponding data is copied from image I2 to image I1 (step 1406). Next, the method includes applying a weighted average of the outer P pixels of the copy (step 1408).

Referring to FIG. 15, the figure is a diagram of an exemplary method for adding/removing objects from a single image according to embodiments of the present invention. An original "Left'" image 1500 and an original "Right'" image 1502 are provided. The images may be paired to form a three-dimensional image in accordance with embodiments of the present invention described herein. The images 1500 and 1502 both show objects, which are designated 1504L and 1506L, respectively, in the "Left'" image 1500, and designated 1504R and 1506R, respectively, in the "Right'" image 1502. The parallax of these objects is such that three-dimensional display of these objects in the three-dimensional image 1504 would be satisfactory to a viewer.

Referring to FIG. 15, the images of another object (designated 1508L in the "Left'" image 1500, and designated 1508R in the "Right'" image 1502) were captured while the object was moving at such a speed such that the parallax disparity of the object in the "Left'" image 1500 and the "Right'" image 1502 makes viewing the three-dimensional image 1504 of the object unsatisfactory to a viewer. For this reason, the moving object may be removed from the "Left'" image 1500 and the "Right'" image 1502. A new "Left'" image 1510 without the moving object may be generated by bounding a region 1512L to be corrected in the original "Left'" image 1500 for removing the moving object (i.e., an area including the moving object in the "Left'" image 1500). A corresponding area in the original "Right'" image 1502 may be copied and used for replacing the bounded region 1512L in the original "Left'" image 1500 to render the new "Left'" image 1510. In a similar manner, a new "Right'" image 1514 without the moving object can be rendered. The new "Left'" image 1510 and the new "Right'" image 1514 can then be paired for rendering a new three-dimensional image 1516 without the moving object.

As an alternative to the procedure of identifying bounding regions of 8×8 blocks around objects to be added or removed in a view, the disparity map calculated using multiple views, "Left", "Right", and/or the images in between, can be applied to one of the "Left" or "Right" single image views to create a new view (e.g., "Left_disparity"). The result of this process is a new stereo pair (e.g., "Left'" and "Left_disparity") that effectively recreates the depth of the original pair, but without object occlusions, movement, additions, or removals. Once created in this manner, the "disparity" view becomes the new opposite image to the original, or for example, a created "Left_disparity" image becomes the new "Right'" image. Effectively, this procedure mimics segmented object removal and/or addition, but on a full image scale.

Returning to FIGS. 3A-3D, the method includes applying 348 color correction to the images. For example, for a plurality of images, a pixel-by-pixel color comparison may be performed to correct lighting changes between image captures. This is performed by using the parallax map to match pixels from Left' to Right' and comparing the luminance and chrominance values of those pixels. Pixels with both large luminance and chrominance discrepancies are ignored, assuming occlusion. Pixels with similar luminance and variable chrominance are altered to average their chrominance levels to be the same. Pixels with similar chrominance and variable luminance are altered to average their luminance values to account for lighting and reflection changes.

For a finalized, color corrected, motion corrected stereoscopic image pair, the "Left'" and "Right'" images are ordered and rendered to a display as a stereoscopic image. The format is based on the display parameters. Rendering can require interlacing, anamorphic compression, pixel alternating, and the like.

For a finalized, color corrected, motion corrected stereoscopic image pair, the "Left'" view may be compressed as the base image and the "Right'" image may be compressed as the disparity difference from the "Left'" using a standard video codec, differential JPEG, or the like.

The method of FIGS. 3A-3D includes displaying 350 the three-dimensional image on a stereoscopic display. For example, the three-dimensional image may be displayed on the display 112 of the device 100 or a display of the computer 108. Alternatively, the three-dimensional image may be suitably communicated to another device for display.

When a video sequence is captured with lateral camera motion as described above, stereoscopic pairs can be found within the sequence of resulting images. Stereoscopic pairs are identified based on their distance from one another determined by motion analysis (e.g., motion estimation techniques). Each pair represents a three-dimensional picture or image, which can be viewed on a suitable stereoscopic display. If the camera does not have a stereoscopic display, the video sequence can be analyzed and processed on any suitable display device. If the video sequence is suitable for creating three-dimensional content (e.g., one or more three-dimensional images), it is likely that there are many potential stereoscopic pairs, as an image captured at a given position may form a pair with images captured at several other positions. The image pairs can be used to create three-dimensional still images or re-sequenced to create a three-dimensional video.

Figure 16:
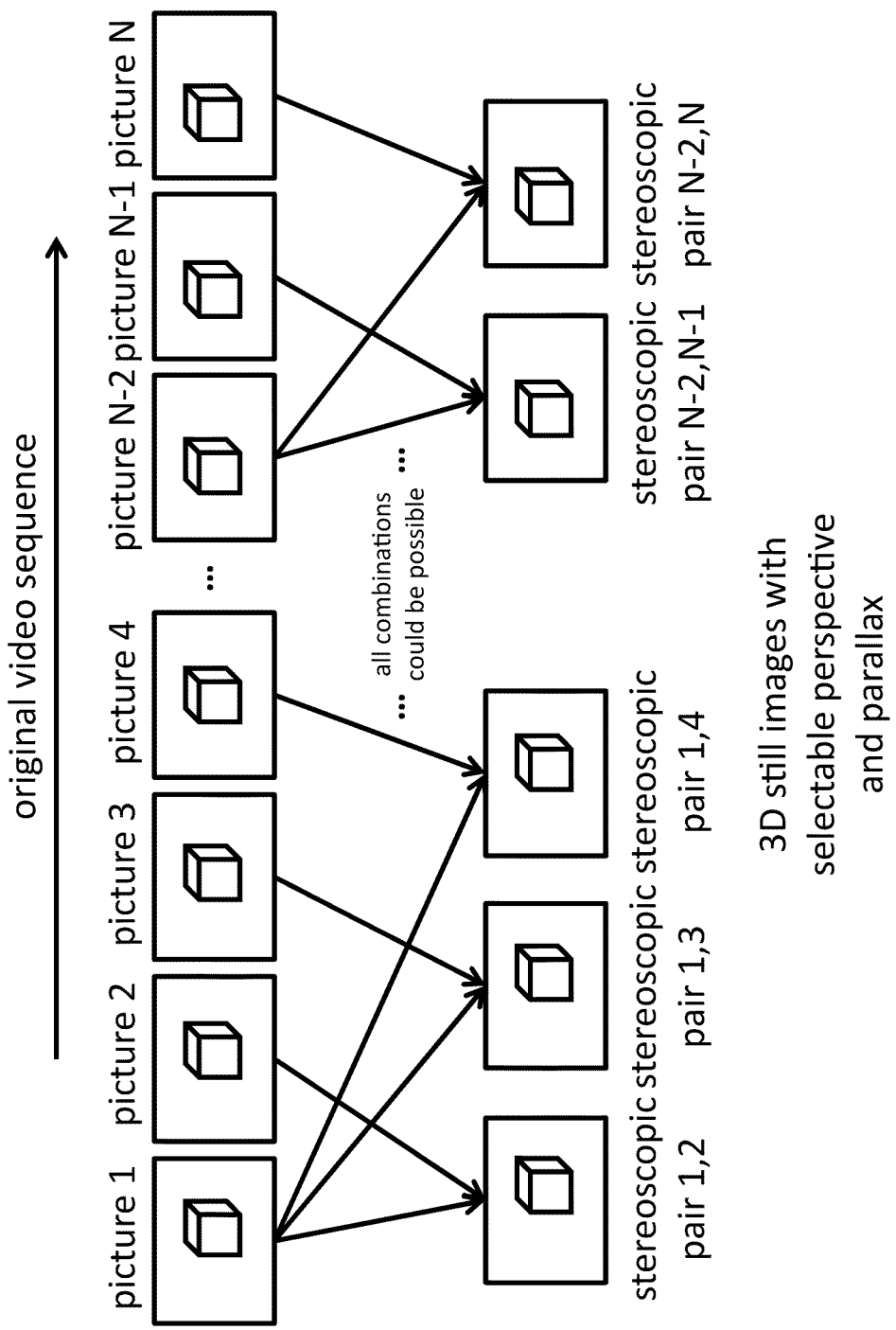
FIG. 16 illustrates an exemplary process for creating three-dimensional still images from a standard two-dimensional video sequence by identifying stereoscopic pairs in accordance with embodiments of the present invention.
Figure 17:
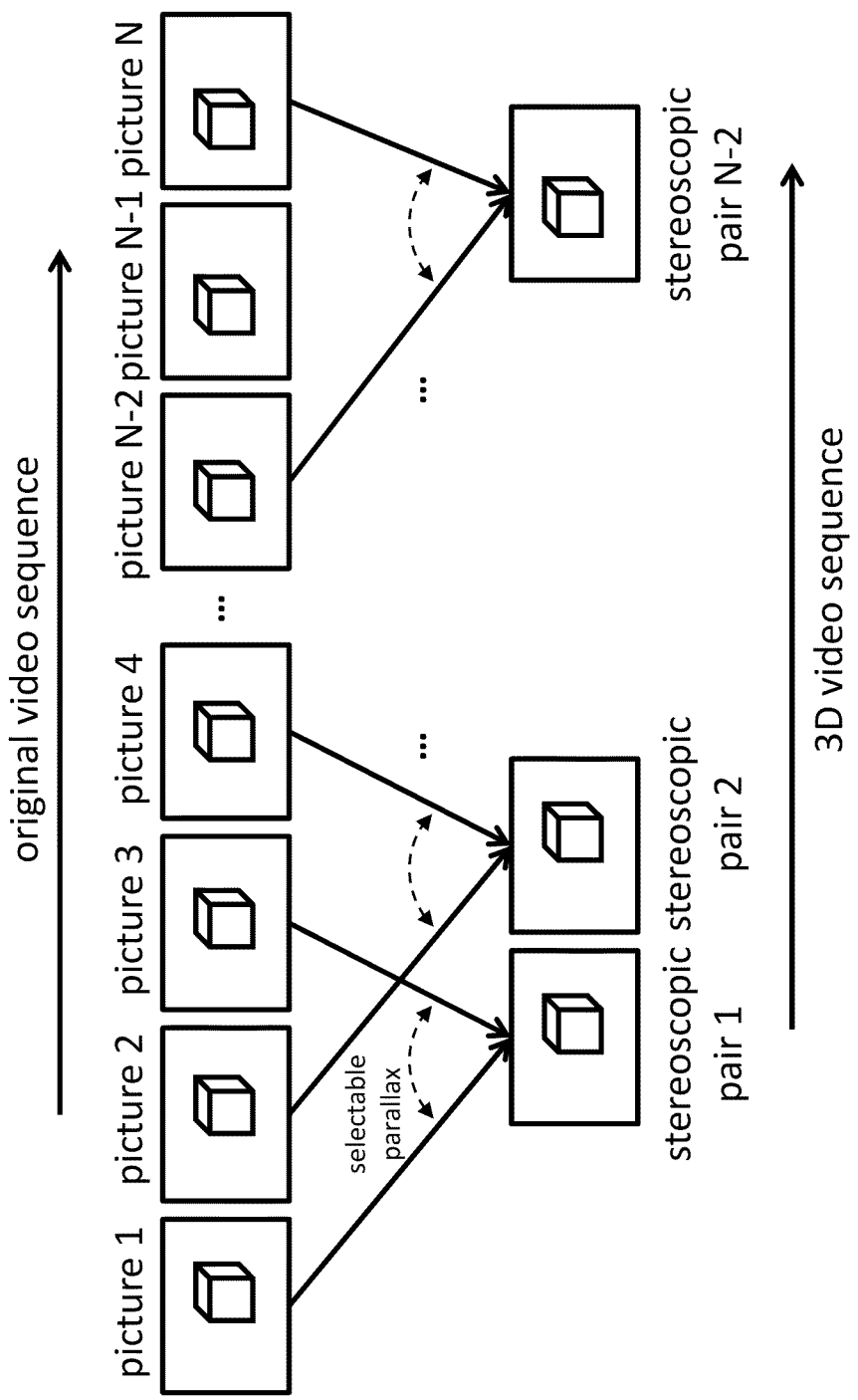
FIG. 17 illustrates an exemplary process for creating three-dimensional video from a standard two-dimensional video sequence according to embodiments of the present invention.

When creating three-dimensional still images, the user can select which images to use from the potential pairs, thereby adjusting both the perspective and parallax of the resulting images to achieve the desired orientation and depth. FIG. 15 illustrates an exemplary process for creating three-dimensional still images from a standard two-dimensional video sequence by identifying stereoscopic pairs in accordance with embodiments of the present invention. Referring to FIG. 16, this process can be used to create content for multi-view stereoscopic displays by creating a set of three-dimensional images of a subject with the same parallax but captured from slightly different positions. A three-dimensional video sequence can be created using one of the following methods. The first method is to select stereoscopic pairs with a constant positional offset, and sequence them in the same relative order in which they were captured. The user can select the offset to achieve the desired depth. During playback this method creates the effect of camera motion the same as occurred during capture, while the depth of the scene remains constant due to the fixed parallax. FIG. 17 illustrates an exemplary process for creating three-dimensional video from a standard two-dimensional video sequence according to embodiments of the present invention.

Figure 18:
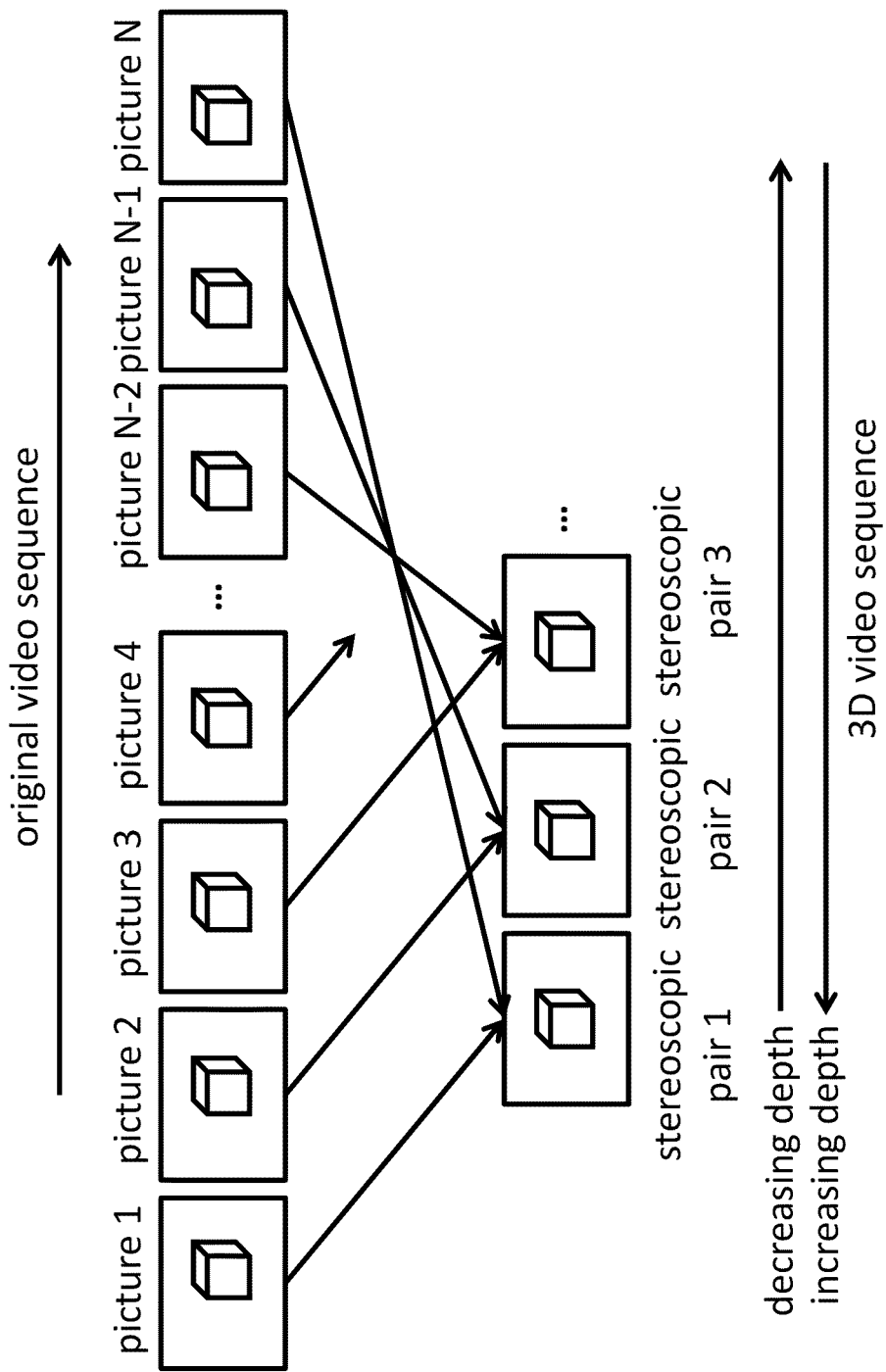
FIG. 18 illustrates an exemplary process of creating three-dimensional video with changing parallax and no translational motion from a standard two-dimensional video sequence in accordance with an embodiment of the subject matter disclosed herein.

Another method of creating a three-dimensional sequence includes creating stereoscopic pairs by grouping the first and last images in the sequence, followed by the second and next-to-last images, and so on until all images have been used. During playback this creates the effect of the camera remaining still while the depth of the scene decreases over time due to decreasing parallax. The three-dimensional images can also be sequenced in the opposite order so that the depth of the scene increases over time. FIG. 18 illustrates an exemplary process of creating three-dimensional video with changing parallax and no translational motion from a standard two-dimensional video sequence in accordance with an embodiment of the subject matter disclosed herein. The camera or other display device can store a representation of the resulting three-dimensional still images or video in an appropriate compressed format. For more efficient storage of still images, one of the images in the stereoscopic pair can be compressed directly, while the other image is represented by its differences with the first image. For video sequences, the first stereoscopic pair in the sequence can be stored as described above for still images, while all images in other pairs are represented by their differences with the first image.

The generation and presentation, such as display, of three-dimensional images of a scene in accordance with embodiments of the present invention may be implemented by a single device or combination of devices. In one or more embodiments of the present invention, images may be captured by a camera such as, but not limited to, a digital camera. The camera may be connected to a personal computer for communication of the captured images to the personal computer. The personal computer may then generate one or more three-dimensional images in accordance with embodiments of the present invention. After generation of the three-dimensional images, the personal computer may communicate the three-dimensional images to the camera for display on a suitable three-dimensional display. The camera may include a suitable three-dimensional display. Also, the camera may be in suitable electronic communication with a high-definition television for display of the three-dimensional images on the television. The communication of the three-dimensional images may be, for example, via an HDMI connection.

In one or more other embodiments of the present invention, three-dimensional images may be generated by a camera and displayed by a separate suitable display. For example, the camera may capture conventional two-dimensional images and then use the captured images to generate three-dimensional images. The camera may be in suitable electronic communication with a high-definition television for display of the three-dimensional images on the television. The communication of the three-dimensional images may be, for example, via an HDMI connection.

The subject matter disclosed herein may be implemented by a digital still camera, a video camera, a mobile phone, a smart phone, phone, and the like. In order to provide additional context for various aspects of the disclosed subject matter, FIG. 19 and the following discussion are intended to provide a brief, general description of a suitable operating environment 1900 in which various aspects of the disclosed subject matter may be implemented. While the invention is described in the general context of computer-executable instructions, such as program modules, executed by one or more computers or other devices, those skilled in the art will recognize that the disclosed subject matter can also be implemented in combination with other program modules and/or as a combination of hardware and software.

Generally, however, program modules include routines, programs, objects, components, data structures, etc. that perform particular tasks or implement particular data types. The operating environment 1800 is only one example of a suitable operating environment and is not intended to suggest any limitation as to the scope of use or functionality of the subject matter disclosed herein. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

Figure 19:
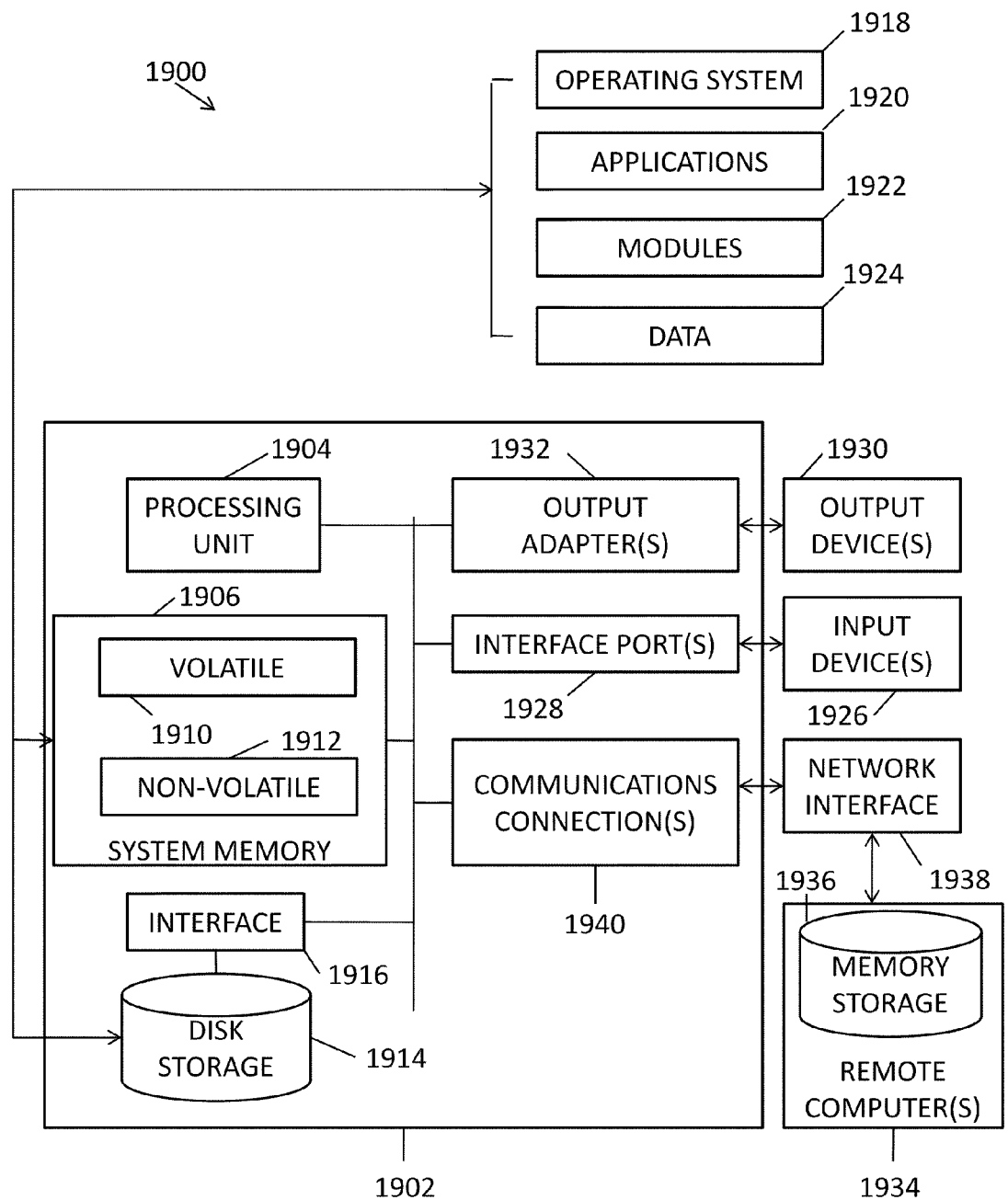
FIG. 19 illustrates an exemplary environment for implementing various aspects of the subject matter disclosed herein.

With reference to FIG. 19, an exemplary environment 1900 for implementing various aspects of the subject matter disclosed herein includes a computer 1902. The computer 1902 includes a processing unit 1904, a system memory 1906, and a system bus 1908. The system bus 1908 couples system components including, but not limited to, the system memory 1906 to the processing unit 1904. The processing unit 1904 can be any of various available processors. Dual microprocessors and other multiprocessor architectures also can be employed as the processing unit 1904.

The system bus 1908 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1906 includes volatile memory 1910 and nonvolatile memory 1912. The basic input/output system (BIOS), containing the basic routines to transfer information between elements within the computer 1902, such as during start-up, is stored in nonvolatile memory 1912. By way of illustration, and not limitation, nonvolatile memory 1912 can include read only memory (ROM), programmable ROM (PROM), electrically programmable ROM (EPROM), electrically erasable ROM (EEPROM), or flash memory. Volatile memory 1910 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1902 also includes removable/nonremovable, volatile/nonvolatile computer storage media. FIG. 19 illustrates, for example, disk storage 1914. Disk storage 1914 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1914 to the system bus 1908, a removable or non-removable interface is typically used such as interface 1916.

It is to be appreciated that FIG. 19 describes software that acts as an intermediary between users and the basic computer resources described in suitable operating environment 1900. Such software includes an operating system 1918. Operating system 1918, which can be stored on disk storage 1914, acts to control and allocate resources of the computer system 1902. System applications 1920 take advantage of the management of resources by operating system 1918 through program modules 1922 and program data 1924 stored either in system memory 1906 or on disk storage 1914. It is to be appreciated that the subject matter disclosed herein can be implemented with various operating systems or combinations of operating systems.

A user enters commands or information into the computer 1902 through input device(s) 1926. Input devices 1926 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1904 through the system bus 1908 via interface port(s) 1928. Interface port(s) 1928 include, for example, a serial port, a parallel port, a game port, and a universal serial bus (USB). Output device(s) 1930 use some of the same type of ports as input device(s) 1926. Thus, for example, a USB port may be used to provide input to computer 1902 and to output information from computer 1902 to an output device 1930. Output adapter 1932 is provided to illustrate that there are some output devices 1930 like monitors, speakers, and printers among other output devices 1930 that require special adapters. The output adapters 1932 include, by way of illustration and not limitation, video and sound cards that provide a means of connection between the output device 1930 and the system bus 1908. It should be noted that other devices and/or systems of devices provide both input and output capabilities such as remote computer(s) 1934.

Computer 1902 can operate in a networked environment using logical connections to one or more remote computers, such as remote computer(s) 1934. The remote computer(s) 1934 can be a personal computer, a server, a router, a network PC, a workstation, a microprocessor based appliance, a peer device or other common network node and the like, and typically includes many or all of the elements described relative to computer 1902. For purposes of brevity, only a memory storage device 1936 is illustrated with remote computer(s) 1934. Remote computer(s) 1934 is logically connected to computer 1902 through a network interface 1938 and then physically connected via communication connection 1940. Network interface 1938 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1940 refers to the hardware/software employed to connect the network interface 1938 to the bus 1908. While communication connection 1940 is shown for illustrative clarity inside computer 1902, it can also be external to computer 1902. The hardware/software necessary for connection to the network interface 1938 includes, for exemplary purposes only, internal and external technologies such as, modems including regular telephone grade modems, cable modems and DSL modems, ISDN adapters, and Ethernet cards.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the processing of the present invention.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method for creating a three-dimensional image of a scene, the method comprising:
   using at least one processor for:
   receiving a plurality of captured images;
   determining matching image features among the plurality of captured images;
   determining a transformation to align at least one of the matched image features;
   applying the transformation to a first captured image among the plurality of captured images such that the first captured image is aligned to a second captured image among the plurality of captured images to create a plurality of transformed images;
   defining a transformed image pair using one of transformed and captured images;
   calculating parallax values of the matched image features of the transformed image pair;
   determining whether the parallax values do not meet a predetermined criteria;
   in response to determining that the parallax values do not meet the predetermined criteria, altering a stereoscopic characteristic of the transformed image pair to create an adjusted image pair; and
   defining a three-dimensional image based on the adjusted image pair.

2. The method of claim 1, wherein the plurality of captured images are captured from the same image capture device.

3. The method of claim 1, wherein the plurality of captured images are a first set of captured images, and
   wherein the method further comprises:
   comparing attributes of the first set of captured images;
   determining a second set of captured images having attributes within a predetermined threshold; and
   selecting images from the second set of captured images for creating a three-dimensional image.

4. The method of claim 3, wherein comparing attributes of the first set of captured images comprises comparing color attributes.

5. The method of claim 3, wherein comparing attributes of the first set of captured images comprises comparing extracted features of the images.

6. The method of claim 3, wherein comparing attributes of the first set of captured images comprises identifying matching edges of the images, and
   wherein determining a second set of captured images comprises determining the second set of images having a number of matched edges that meets a predetermined threshold.

7. The method of claim 3, further comprising:
   applying a Hough transform to identify lines within the images; and
   determining perspective view changes between the images based on the identified lines.

8. The method of claim 1, further comprising determining whether images among the plurality of captured images are suitable for creating a stereoscopic pair by examining one of: large occluded areas, large non-overlapping regions, and large vertical parallax.

9. The method of claim 1, further comprising:
   comparing color attributes of the captured images;
   determining pixels in the captured images having color attributes that are above a predetermined color threshold; and
   modifying a plurality of pixels having color that is above a predetermined threshold to match the color of the corresponding pixels in another image.

10. The method of claim 1, further comprising changing a position of a screen plane of a transformed pair of images.

11. The method of claim 1, further comprising changing parallax of an object within at least one of the captured and transformed images.

12. The method of claim 1, further comprising enhancing a depth of a transformed pair of images.

13. The method of claim 1, further comprising automatically determining a left view image and a right view of an image pair for creating a stereoscopic pair.

14. The method of claim 1, wherein determining matching image features comprises:
    performing horizontal and vertical edge detection;
    filtering for strong edges of a minimum length; and
    identifying crossing points of the strong edges.

15. The method of claim 1, further comprising utilizing motion estimation techniques to identify matching features between captured images.

16. The method of claim 1, further comprising utilizing epipoles along with an interest point set to generate a pair of rectifying homographies.

17. The method of claim 1, further comprising evaluating whether focal axes are parallel and proceeding with image registration if the angle of the axes is below a predetermined threshold.

18. The method of claim 1, further comprising:
    determining a parallax disparity between a left view image and a right view image among the captured images;
    determining whether the parallax disparity meets a predetermined criteria; and
    in response to determining that the parallax disparity does not meet the predetermined criteria, adjusting an attribute of at least one pixel in one of a left view image and a right view image such that the parallax disparity meets predetermined criteria.

19. The method of claim 1, further comprising cropping one of the left view image and the right view of the transformed image pair.

20. The method of claim 1, further comprising:
    determining a parallax disparity between at least a portion of an object in a left view image and a right view image among one of the captured and transformed images;
    determining whether the parallax disparity is greater than a predetermined threshold level due to an object moving in the scene; and
    in response to determining that the parallax disparity is greater than the predetermined threshold level, adjusting at least one of images in the pair.

21. The method of claim 20, further comprising creating a new image by performing one of:
    moving one object to another position of the same image; and
    removing one object from an image; and
    adding an object from one image to the other image.

22. The method of claim 20, further comprising capturing multiple images of the same scene to remove objects from a scene.

23. The method of claim 20, further comprising capturing multiple images of the same scene by moving the camera laterally to remove objects from a scene.

24. The method of claim 20, further comprising:
   identifying at least of one moving object within a stereoscopic pair;
   identifying the same object in a second set of captured images;
   copying the identified object to one of left or right images; and
   adjusting disparities.

25. The method of claim 20, further comprising identifying the most suitable image from the set of captured pictures from which to extract the moving object.

26. The method of claim 20, further comprising identifying an object that exists in a first set of images but not on a second set of images and remove from the second set of images.

27. The method of claim 20, further comprising interpolating pixels on areas from where an object has been removed utilizing pixels from the other captured images.

28. The method of claim 1, further comprising calculating and saving disparity information of a plurality of matched image features.

* * * * *